US005943465A

United States Patent [19]

[11] Patent Number: 5,943,465
[45] Date of Patent: Aug. 24, 1999

Kawaguchi et al.

[54] OPTICAL WAVEGUIDE ELEMENT, OPTICAL ELEMENT, METHOD FOR PRODUCING OPTICAL WAVEGUIDE ELEMENT AND METHOD FOR PRODUCING PERIODIC DOMAIN-INVERTED STRUCTURE

[75] Inventors: Tatsuo Kawaguchi; Takashi Yoshino; Minoru Imaeda, all of Nagoya; Kiminori Mizuuchi, Neyagawa; Kazuhisa Yamamoto, Takatsuki, all of Japan

[73] Assignee: NGK Insulators, Ltd., Japan

[21] Appl. No.: 08/826,377

[22] Filed: Apr. 9, 1997

[30] Foreign Application Priority Data

Apr. 15, 1996 [JP] Japan .................................... 8-092120
Mar. 7, 1997 [JP] Japan .................................... 9-052679

[51] Int. Cl.[6] ................................ G02B 6/00; G02F 1/35; H01L 21/208

[52] U.S. Cl. ............................ 385/122; 385/11; 385/129; 385/130; 385/131; 385/141; 359/326; 359/328; 359/332; 437/130; 437/51

[58] Field of Search .................................... 385/122, 130, 385/141, 132, 142, 129, 37, 11; 359/326, 328, 332; 437/130, 141, 144, 51

[56] References Cited

U.S. PATENT DOCUMENTS

| | | | |
|---|---|---|---|
| 5,249,250 | 9/1993 | Yamada et al. | 385/122 |
| 5,274,727 | 12/1993 | Ito et al. | 385/122 |
| 5,295,218 | 3/1994 | Agostinelli et al. | 395/122 |
| 5,317,446 | 5/1994 | Mir et al. | 359/296 |
| 5,351,219 | 9/1994 | Adachi et al. | 367/140 |
| 5,526,173 | 6/1996 | Yamaguchi et al. | 359/328 |
| 5,753,300 | 5/1998 | Wessels et al. | 427/126.3 |

FOREIGN PATENT DOCUMENTS

| | | | |
|---|---|---|---|
| 0 486 769 | 5/1992 | European Pat. Off. | 385/122 X |
| 0 699 934 | 3/1996 | European Pat. Off. | 385/122 X |
| 63-158506 | 7/1988 | Japan | 385/122 X |
| 4-104233 | 4/1992 | Japan | 385/122 X |

OTHER PUBLICATIONS

MOC/GRIN '93 Kawasaki, "Fundamental Properties of LiNbO3 Thin–Film Optical Waveguide Grown by Liquid Phase Epitaxy," by Atsuo Yamada et al., pp. 58–61.

J. Appl. Phys. 75 (3), Feb. 1, 1994, "Domain Inversion in LiTaO3 Using Proton Exchange Followed By Heat Treatment," by Kiminori Mizuuchi et al., pp. 1311–1318.

Tatsuo Kawaguchi, et al., Domain–inverted Growth of $LiNbO_3$ Films by Liquid–Phase Epitaxy, Journal of Crystal Growth, Jul. 1997, Elsevier, Netherlands, vol. 178, No. 4, pp. 524–528.

*Primary Examiner*—Brian Healy
*Attorney, Agent, or Firm*—Wall Marjama Bilinski & Burr

[57] ABSTRACT

An excellent periodic domain-inverted structure formed on a ferroelectric optical single crystal substrate is provided having an improved crystalline property of the substrate and an improved resistance to optical damage and output of the domain-inverted structure and the like optical waveguide structure by forming protruded and recessed portions on a single-domained ferroelectric optical single crystal substrate 1, growing a film of a ferroelectric optical single crystal film 4 on the respective recessed portion of the single crystal substrate 1 by a liquid phase epitaxial growing process. At that time, the Curie temperature of the film 4 is lower than the liquid phase epitaxial growing temperature of the film 4, and the Curie temperature of the substrate 1 is higher than the liquid phase epitaxial growing temperature of the film 4, and the film 4 is polarized in an opposite direction to the polarization direction of the substrate 1.

11 Claims, 15 Drawing Sheets

FIG_1a
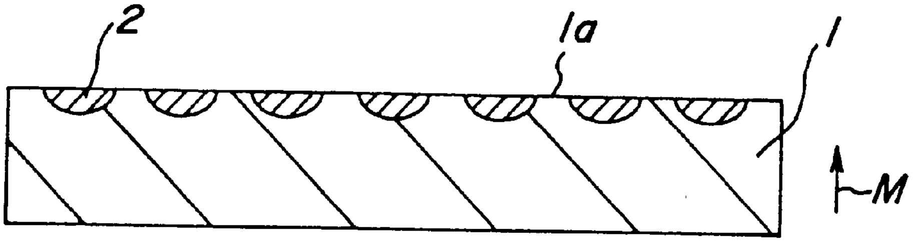
FIG_1b
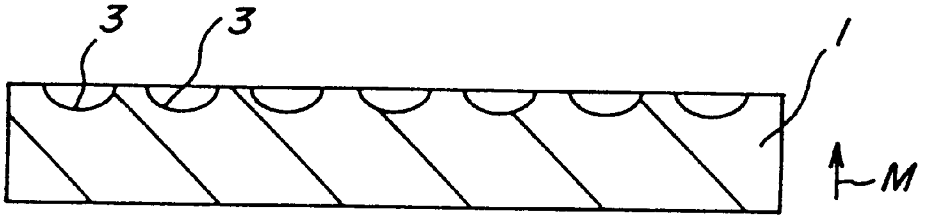
FIG_1c
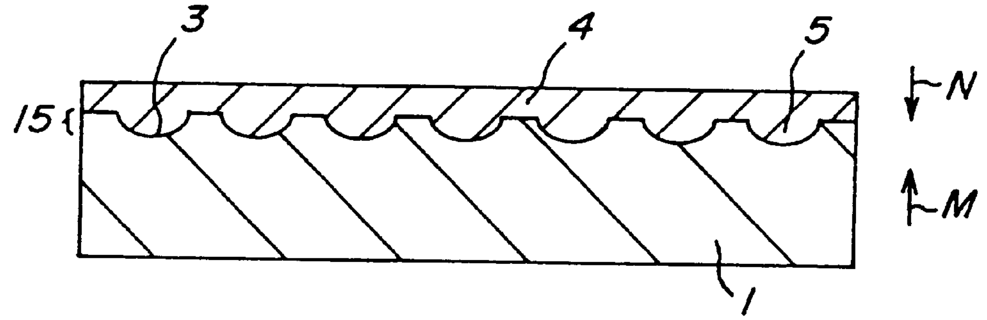
FIG_1d
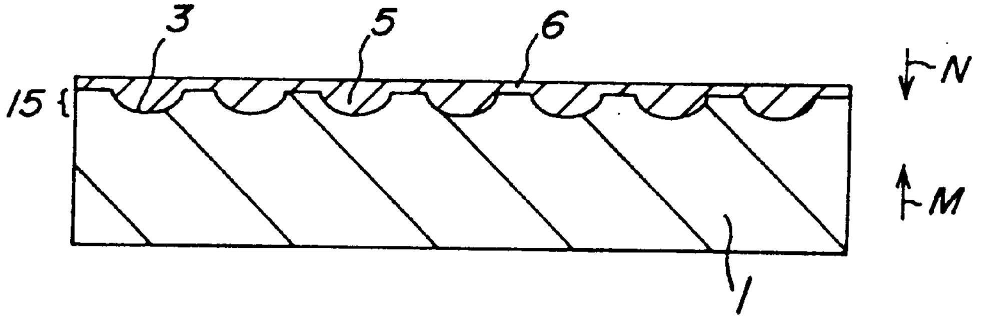

FIG_2a
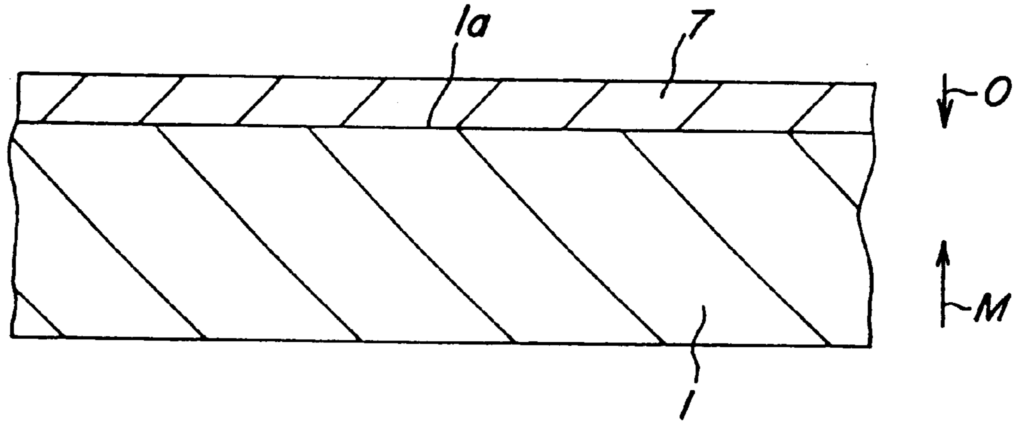
FIG_2b
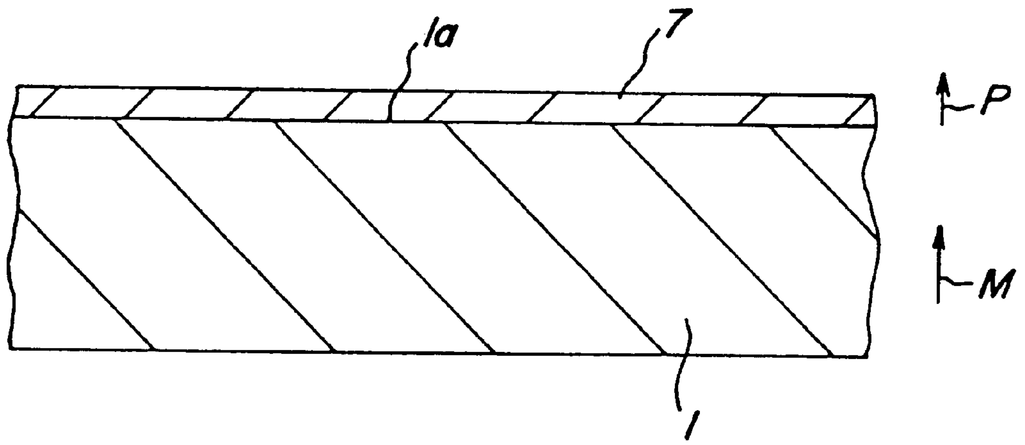
FIG_2c
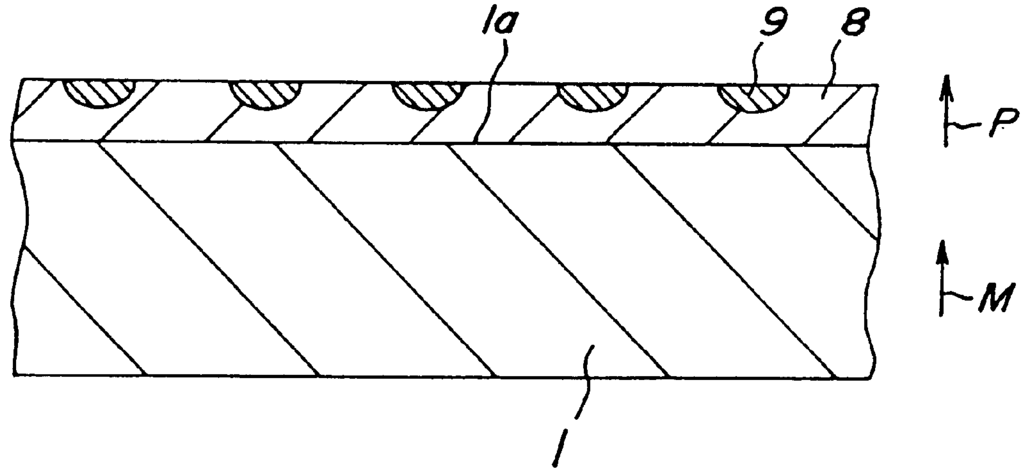

FIG_3a
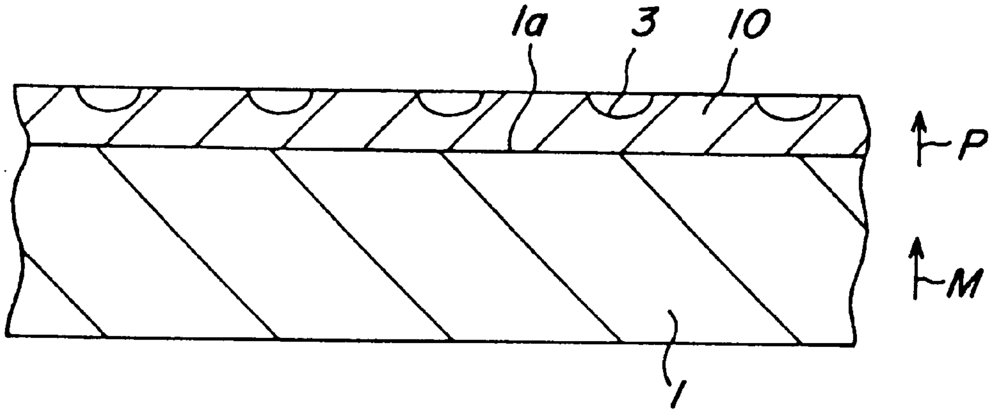
FIG_3b
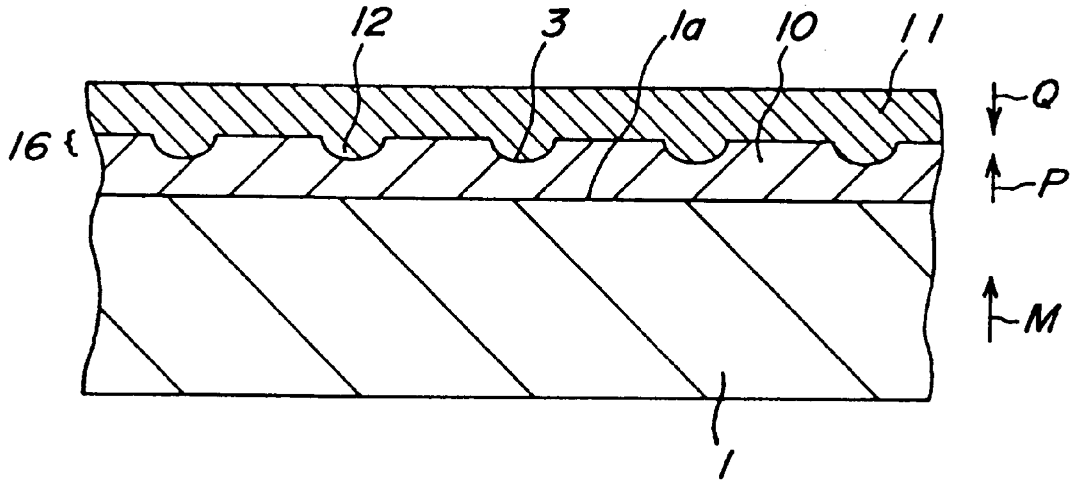
FIG_3c
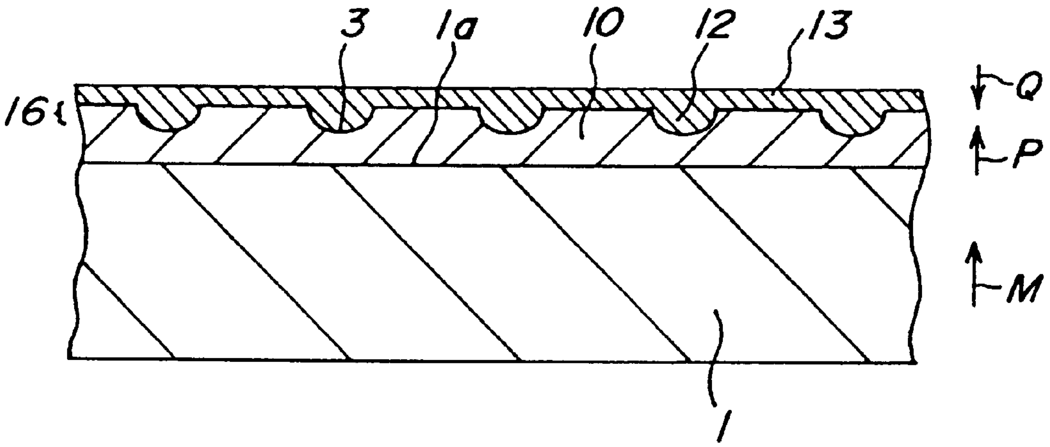

FIG_4
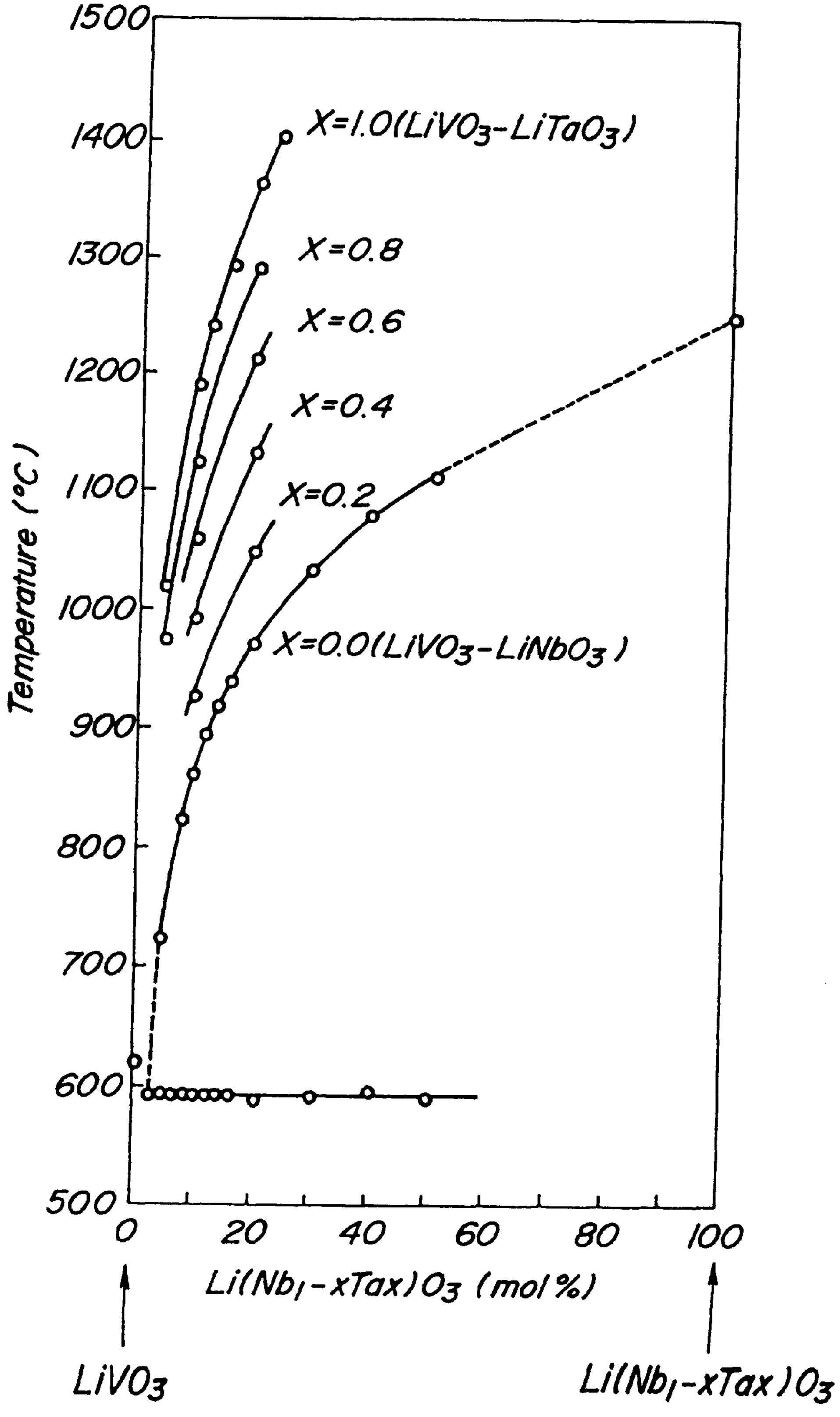

FIG_7
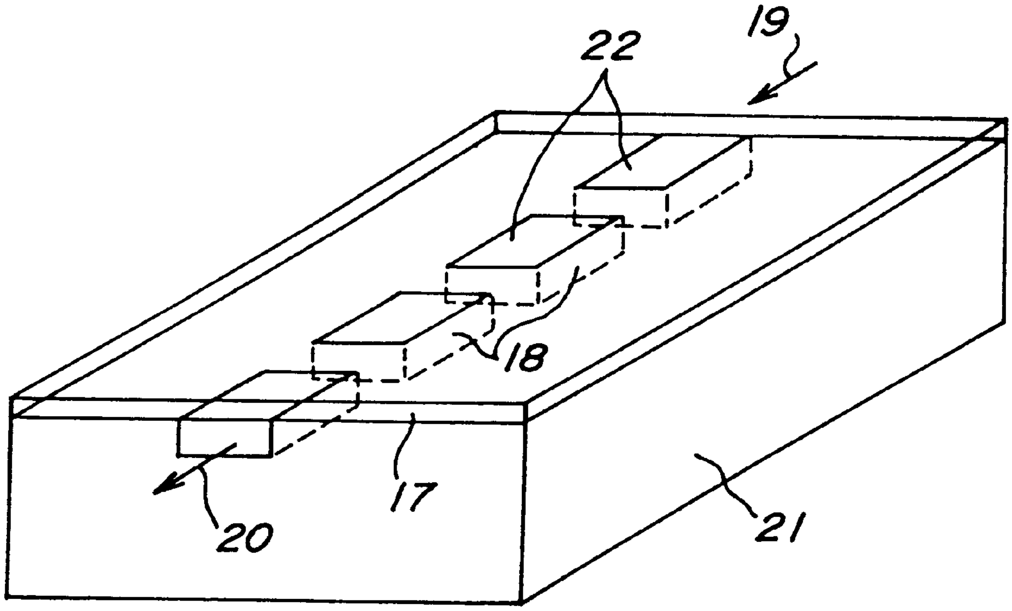
FIG_8
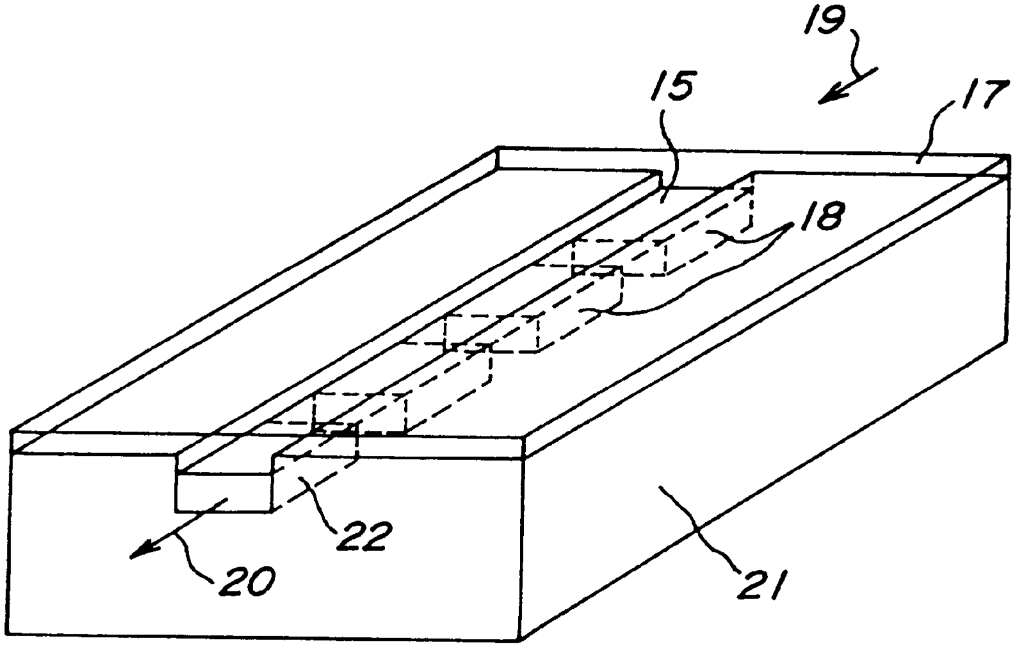

FIG_9
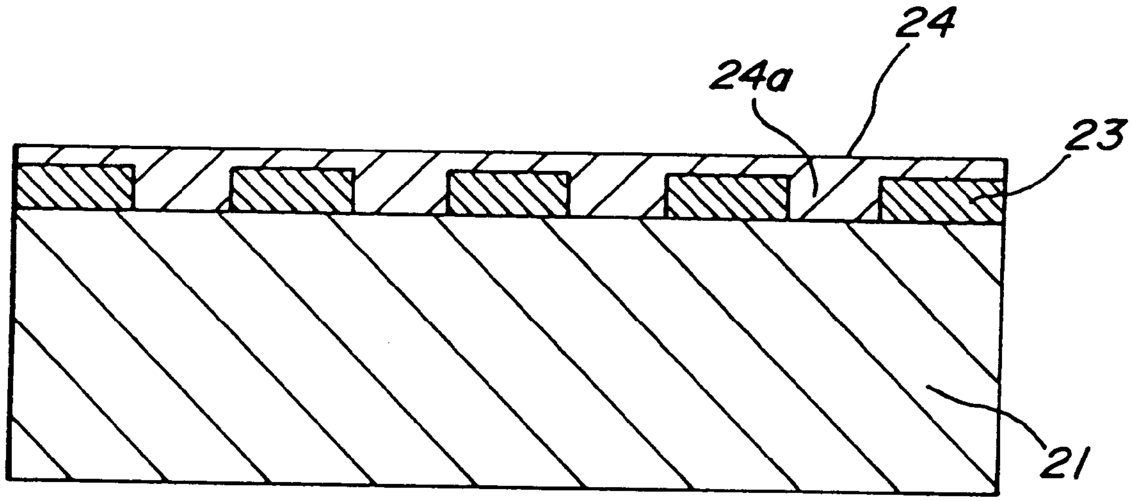

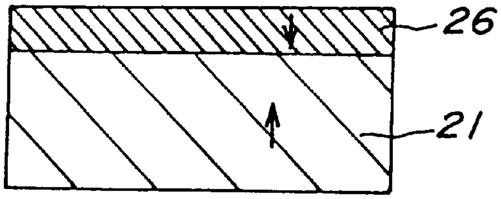
FIG_10a
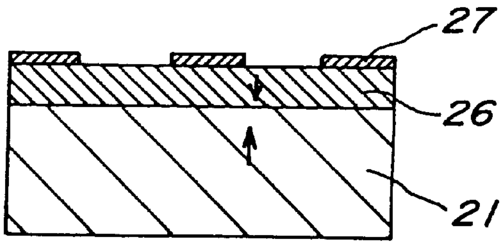
FIG_10b
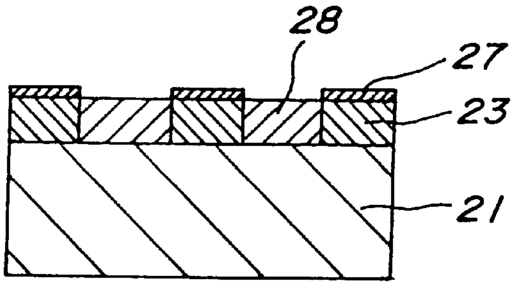
FIG_10c
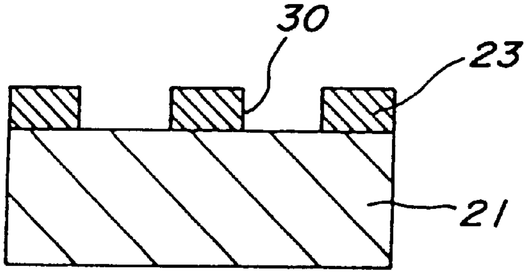
FIG_10d
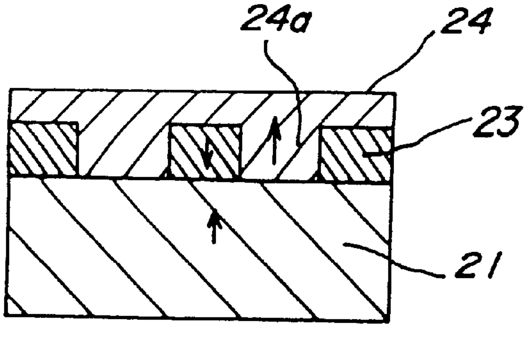
FIG_10e FIG_12a
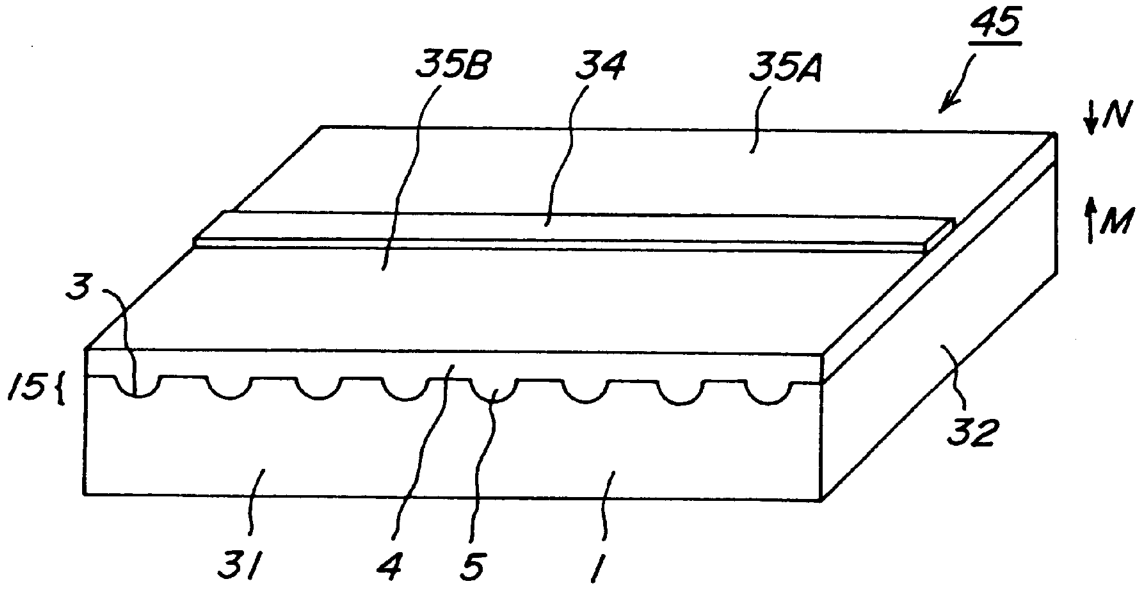
FIG_12b
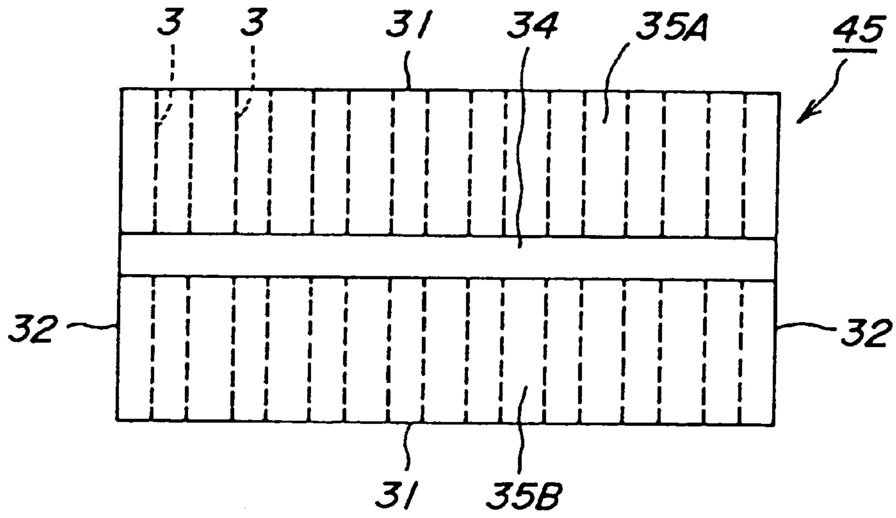

FIG_14a
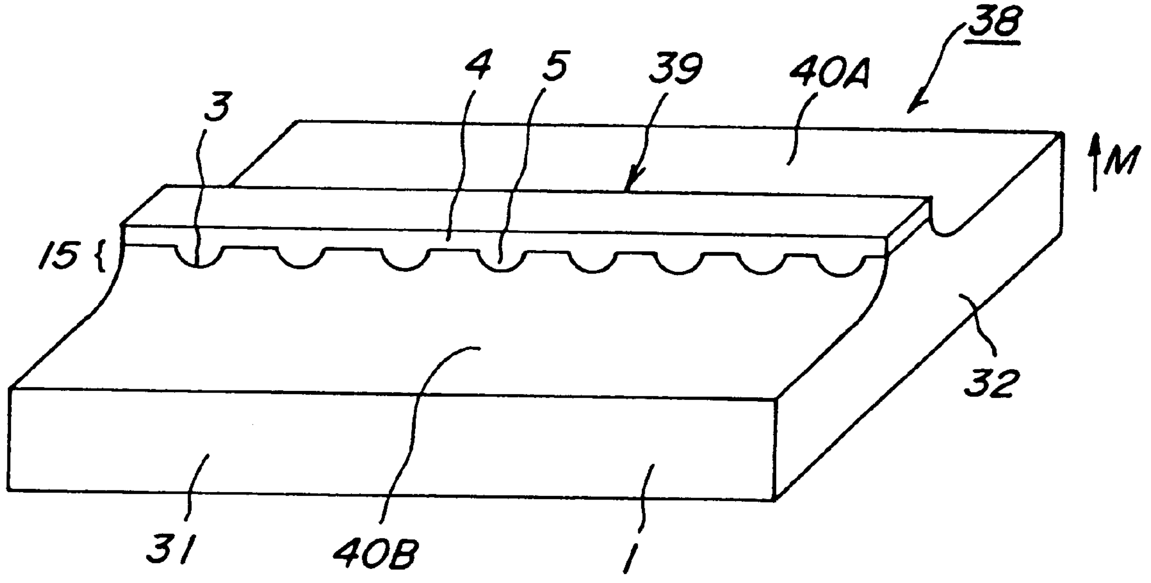
FIG_14b
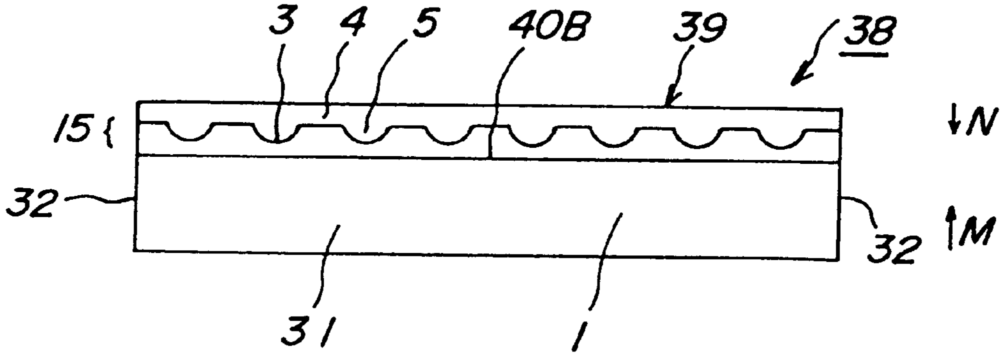

FIG_16a
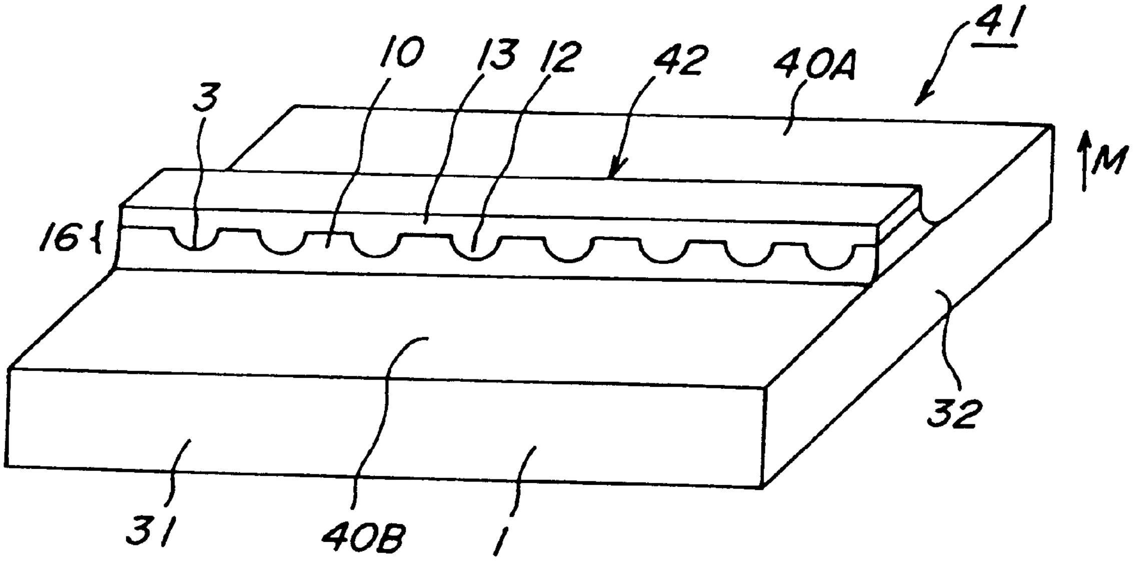
FIG_16b
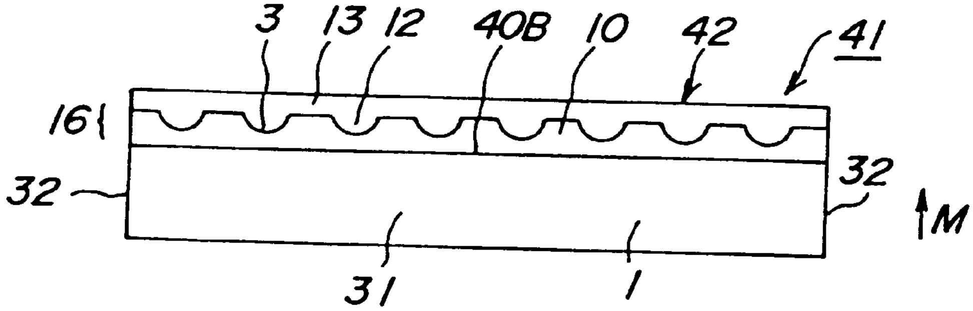

OPTICAL WAVEGUIDE ELEMENT, OPTICAL ELEMENT, METHOD FOR PRODUCING OPTICAL WAVEGUIDE ELEMENT AND METHOD FOR PRODUCING PERIODIC DOMAIN-INVERTED STRUCTURE

BACKGROUND OF THE INVENTION

1. Field of the Invention

The present invention relates to an optical waveguide element which can be used as a second-harmonic-generation (SHG) device of quasi-phase-matched system (QPM), a method for producing the same and a method for producing a periodical domain-inverted structure.

2. Related Art Statement

As a beam light source of a blue laser beam light used for optical pick up etc., a SHG device of QPM system using an optical waveguide element having a periodic domain-inverted structure on lithium niobate or lithium tantalate single crystal has been expected. Such a device can be used to a broad range of applications including optical disc memory, medical use, photochemical use, and various optical measurements. For example, Japanese Patent Application Laid-open No. 4-104,233 describes that a film is grown on a ferroelectric optical single crystal substrate which was subjected to a treatment of producing single crystal domains (to be referred as “single-domained”, hereinafter) by a liquid phase epitaxial growing process, and using the film having Curie temperature higher than the film-forming temperature (liquid phase epitaxial temperature) at that time, thereby to produce a ferroelectric optical single crystal film which is single-domained opposite to the substrate. The film is considered to become multi-domained when film has Curie temperature lower than the film forming temperature.

However, such a method could produce only a film of a composition having Curie temperature higher than the liquid phase epitaxial growing temperature and hence the composition of the film is very narrowly restricted, so that the method could not be used for practical uses. Particularly, when a domain-inverted structure produced by this method was used for a SHG device etc., damage caused by the beam light was liable to increase and hence the proportion of the output to the input of SHG became small, so that a practical device could not be provided.

As a process of providing a protruded and recessed structure for QPM on a surface or a main surface of the ferroelectric substrate, a dry process like a reactive ion etching process has been used. However, the method gave large damages to the substrate to largely deteriorate the crystalline property of the substrate. Thus, when the method was used for producing a SHG device, the conversion efficiency and the resistance to optical damage of the SHG device were decreased.

Because the conversion efficiency of a SHG device is improved in proportion to the power density of the fundamental wave, an increasement of the waveguide power of the of the fundamental wave by means of an optical waveguide is effective. For that purpose, the optical waveguide has to be changed to a channel waveguide structure of a three dimensional structure. However, in order to provide a channel waveguide, an ion exchange, metal diffusion or dry etching process like a reactive ion etching process is necessary which affects a large damage to the substrate to deteriorate the crystalline property of the substrate. Thus, the resistance to optical damage and conversion efficiency of the optical element of the SHG device were decreased. In addition, the producing process became complicated to decrease the production efficiency.

SUMMARY OF THE INVENTION

An object of the present invention is to improve the resistance to optical damage of the domain-inverted structure etc. at the time of providing the domain-inverted structure etc. on the ferroelectric optical single crystal substrate.

Another object of the present invention is to decrease the damage on the ferroelectric optical single crystal substrate at that time and improve the crystalline property of the substrate after the treatment thereby to improve the resistance to optical damage and output of the periodic domain-inverted structure.

The present invention is a method for producing an optical waveguide element having a single-domained ferroelectric optical single crystal substrate and a ferroelectric optical single crystal film formed on the single crystal substrate, comprising growing the single crystal film by a liquid phase epitaxial growing process on at least the respective recess of protruded and recessed portions of the substrate by a liquid phase epitaxial growing process, the single crystal film having Curie temperature lower than the liquid phase epitaxial growing temperature of the single crystal film, the substrate having Curie temperature higher than the liquid phase epitaxial growing temperature of the single crystal film, and polarizing the single crystal film in an opposite direction to that of the substrate. The present invention is also an optical waveguide element produced by the present method.

The present invention is also a method for producing an optical waveguide element having a single-domained ferroelectric optical single crystal substrate, a first ferroelectric optical single crystal film formed on the single crystal substrate and a second ferroelectric optical single crystal film formed on the first single crystal film, comprising growing the first single crystal film on the main surface of the single crystal substrate by a liquid phase epitaxial growing process, the first single crystal film having Curie temperature lower than the liquid phase epitaxial growing temperature of the first single crystal film, the substrate having Curie temperature higher than the liquid phase epitaxial growing temperature of the first single crystal film, polarizing the first single crystal film in the same direction to that of the substrate, forming protruded and recessed portions in the first single crystal film, providing protruded and recessed portions on the first single crystal film, growing the second single crystal film on at least the respective recess of the protruded and recessed portions by a liquid phase epitaxial growing process, the second single crystal film having Curie temperature lower than the liquid phase epitaxial growing temperature of the second single crystal film, the substrate having Curie temperature higher than the liquid phase epitaxial growing temperature of the second single crystal film, and polarizing the second single crystal film in an opposite direction to that of the substrate. The present invention is also an optical waveguide element produced by the present method.

The present invention is also a method for producing a domain-inverted structure having a periodically domain-inverted ferroelectric optical single crystal structure on a single-domained ferroelectric optical single crystal substrate, comprising providing a mask of a periodic pattern on the substrate, providing proton-exchanged portions in the non-masked portions of the substrate by a proton exchange process, selectively removing the proton-exchanged portions to provide a desired pattern of protruded and recessed portions in the substrate, providing a ferroelectric optical single crystal film on at least the respective recess of the substrate by a liquid phase epitaxial growing process, and reversing the polarization direction of the single crystal film to the direction of the substrate. Preferably, the substrate is a single-domained ferroelectric optical single crystal substrate or a ferroelectric optical single crystal film polarized in one direction.

The present invention is also an optical element having a single-domained ferroelectric optical single crystal substrate and a ferroelectric optical single crystal film formed on the substrate by a liquid phase epitaxial growing process, comprising recessed portions periodically formed on the substrate, the single crystal film being provided on at least the respective recess by a liquid phase epitaxial growing process, reversing the polarization direction of the single crystal film to the direction of the substrate. By selecting a material having a refractive index larger than the substrate as the ferroelectric optical single crystal film, an optical element having a function of channel waveguide can be constituted.

The present invention is also an optical element having a single-domained ferroelectric optical single crystal substrate and a ferroelectric optical single crystal film formed in the substrate by a liquid phase epitaxial growing process, comprising a stripe-shaped groove formed in the substrate, periodic protruded and recessed portions formed in the stripe-shaped groove, the single crystal film being formed on at least the stripe-shaped groove including the periodic protruded and recessed portions, the single crystal film being polarized in the reverse direction to that of the substrate. By selecting a material having a refractive index larger than the substrate as the ferroelectric optical single crystal film, an optical element having a function of channel waveguide can be constituted.

The present invention is also an optical element having a single-domained ferroelectric optical single crystal substrate and a ferroelectric optical single crystal film formed on the substrate by a liquid phase epitaxial growing process, comprising periodic protruded and recessed portions formed on the substrate, the single crystal film being formed on at least the respective recess, the single crystal film being polarized in the reverse direction to that of the substrate. By using a material having a refractive index higher than the substrate as the periodically formed protruded portions, an optical element having a function of optical waveguide can be constituted.

The inventors have made studies on the production of optical waveguide devices and elements having a periodic domain-inverted structure, in order to improve the resistance to optical damage of the optical waveguide devices and elements as well as the output and the conversion efficiency. In the process of the studies, the inventors have found out that a ferroelectric optical single crystal film of a superior crystalline property can be produced by providing a mask of a pattern corresponding to a domain-inverted structure on a surface of the ferroelectric optical single crystal substrate, selectively proton-exchanging the non-masked portions of the substrate, selectively etching the proton-exchanged portions to form protruded and recessed portions, and growing the ferroelectric optical single crystal film on the protruded and recessed portions by a liquid phase epitaxial growing process. The inventors have also found out that the crystalline property of the ferroelectric optical single crystal substrate is not deteriorated substantially during the whole process of the production.

The inventors tried to produce the ferroelectric optical single crystal film on the ferroelectric optical single crystal substrate by a liquid phase epitaxial growing process at a film-forming temperature or liquid phase epitaxial temperature higher than Curie temperature of the single crystal film. Such a combination was denied in the above described Japanese Patent Application Laid-open No. 4-104,233 as resulting in a multi-domain state of the polarization direction of the single crystal film, even when the polarization direction of the substrate is held at a single domain state.

However, the inventors have also found out that, even when the single crystal film is actually grown at a film-forming temperature higher than Curie temperature of the single crystal film by a liquid phase epitaxial growing process on the single-domained substrate, the polarization direction of the single crystal film can be maintained in a reverse direction to the polarization direction of the substrate and the single crystal film can be made to a single-domained state. By this finding, a ferroelectric optical single crystal film of a composition which heretofore has been considered as impossible to produce can now be produced. In addition, such a device has a superior resistance to optical damage and hence the output of the beam light, particularly the conversion efficiency in case of a SHG device, is extremely superior.

Also, the inventors have succeeded in producing a first ferroelectric optical single crystal film on the single-domained ferroelectric optical single crystal substrate by a liquid phase epitaxial growing process, and producing a desired pattern of protruded and recessed structure also on the first single crystal film by the aforedescribed method. The inventors have found out that an optical device of a superior resistance to optical damage can also be produced by producing a second ferroelectric optical single crystal film on at least the recess of the protruded and recessed structure.

The present invention is also a method for producing an optical element having a single-domained ferroelectric optical single crystal substrate, at least one layer of ferroelectric optical single crystal film formed on the substrate, a ridge structure protruded from the substrate, and a domain-inverted structure formed in the ridge structure, comprising providing a mask of a shape corresponding to the ridge structure on a laminated body having at least the aforedescribed substrate and single crystal film and the domain-inverted structure, forming proton-exchanged portions in the non-masked portions of the laminated body by a proton-exchange process, and selectively removing the proton-exchanged portions to provide the ridge structure.

Preferably, a mask of a pattern corresponding to the domain-inverted structure is provided on the substrate, the non-masked portions of the substrate are proton-exchanged to provide proton-exchanged portions in the non-masked portion of the substrate, the proton-exchanged portions are selectively removed to provide a desired pattern of protruded and recessed portions in the substrate, the ferroelectric optical single crystal film is grown on at least the respective recessed portion of the protruded and recessed portions by a liquid phase epitaxial growing process, and the polarization direction of the single crystal film is reversed to the substrate at that time to provide the periodic domain-inverted structure.

Alternatively, a ferroelectric optical single crystal preliminary layer is provided on the substrate, a mask of a pattern corresponding to the domain-inverted structure is provided on the preliminary layer, the non-masked portions of the preliminary layer are proton-exchanged to provide proton-exchanged portions, the proton-exchanged portions are selectively removed to provide a desired pattern of protruded and recessed portions in the preliminary layer, the ferroelectric optical single crystal film is grown on at least the respective recessed portion of the protruded and recessed portions by a liquid phase epitaxial growing process, and the polarization direction of the single crystal film is reversed to the preliminary layer at that time to provide the periodic domain-inverted structure.

BRIEF DESCRIPTION OF THE DRAWINGS

For a better understanding of the present invention, reference is made to the accompanying drawings, in which:

FIGS. 1*a*–1*d* are schematic cross-sectional views illustrating the production process of the optical waveguide element;

FIGS. 2*a*–2*c* are schematic cross-sectional views illustrating the process of producing proton-exchanged portions on the first ferroelectric optical single crystal film;

FIGS. 3*a*–3*c* are schematic cross-sectional views illustrating the process of selectively removing the proton-exchanged portions from the first ferroelectric optical single crystal film and providing a second ferroelectric optical single crystal film on the first single crystal film;

FIG. 4 is a phase diagram of a pseudo-binary composition of LiNb1-xTax $O_3$—$LiVO_3$;

FIG. 7 is a schematic perspective view of a SHG device according to a segment type optical waveguide structure showing rectangular recesses 18 formed on a single-domained ferroelectric optical single crystal substrate 21 and a ferroelectric optical single crystal film 17 formed on the substrate 21 including the rectangular recesses 18;

FIG. 8 is a schematic perspective view of a SHG device according to a segment type+embedded type optical waveguide structure showing a stripe-shaped groove 15 formed on the single-domained ferroelectric optical single crystal substrate 21 and rectangular recesses 18 formed in the stripe-shaped groove 15;

FIG. 9 is a schematic cross-sectional view of a segment type optical waveguide using protruded portions of a high refractive index illustrating the protruded portions 23 of a large refractive index provided on the substrate 21 and a ferroelectric optical single crystal 24 provided on the protruded portions 23;

FIGS. 10*a*–10*e* are schematic cross-sectional views illustrating the process of producing the device of FIG. 9;

FIG. 12*a* is a schematic perspective view of the laminated body 45 having a mask 34 provided thereon;

FIG. 12*b* is a schematic plan view of the laminated body 45 of FIG. 12*a;*

FIG. 14*a* is a schematic perspective view of an optical element 38 having the periodic domain-inverted structure 15 formed in a ridge structure 39;

FIG. 14*b* is a schematic front view of the optical element 38 of FIG. 14*a;*

FIG. 16*a* is a schematic perspective view of an optical element 41 having the periodic domain-inverted structure 16 formed in a ridge structure 42; and FIG. 16*b* is a schematic front view of the optical element 41 of FIG. 16*a;*

NUMBERING IN THE DRAWINGS

Figure 5:
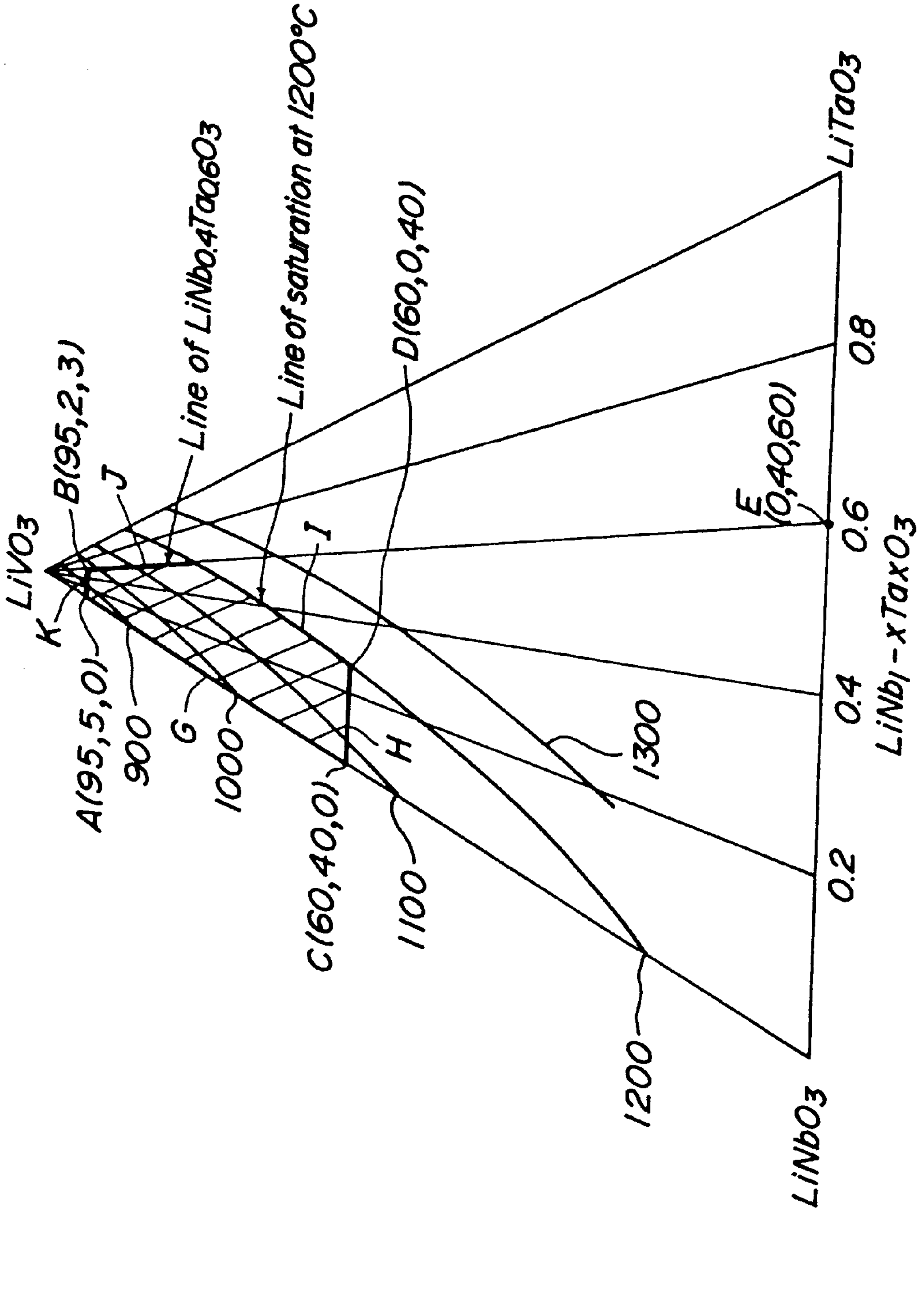
FIG. 5 is a three elementary phase diagram of a pseudo-ternary composition of $LiNbO_3$—$LiTaO_3$—$LiVO_3$ prepared by modifying the phase diagram of FIG. 4.

1 . . . ferroelectric optical single crystal substrate

1*a* . . . main surface of the substrate 1

2, 9 . . . proton-exchanged portions

3 . . . recessed portions

4, 6 . . . ferroelectric optical single crystal film

7, 8, 10 . . . first ferroelectric optical single crystal film (preliminary layer)

11 . . . second ferroelectric optical single crystal film

15 . . . stripe-shaped groove

17 . . . ferroelectric optical single crystal film

18 . . . rectangular recess

21 . . . ferroelectric optical single crystal substrate

23 . . . protruded portion made of ferroelectric optical single crystal of a large refractive index;

24 . . . ferroelectric optical single crystal film

34 . . . mask for proton exchange

36A. 36B . . . proton-exchanged layer

38, 41 . . . optical element

39, 42 . . . ridge structure

40A, 40B . . . recessed portion formed by removal of the proton-exchanged layer

45, 46 . . . laminated body

M, N, O, P, Q . . . direction of polarization.

DETAILED DESCRIPTION OF THE INVENTION

The process and the device of the present invention will be explained in more detail hereinbelow with reference to FIGS. 1–3.

Referring to FIG. 1*a*, a single-domained ferroelectric optical single crystal substrate 1 has a polarization direction as shown by the arrow M. The single crystals constituting the substrate 1 are polarized in the vertical direction to the main surface 1*a* of the substrate 1. The process of providing the single-domained substrate is publicly known. Then, a mask of a desired pattern is provided on the main surface 1*a* of the substrate 1. The mask pattern can be produced in a usual process. As the material for forming the mask, use may be made of, for example, Ta, W, Ti, Au, $SiO_2$, $Ta_2O_3$, Al, Cr, Pt. As the process of producing the mask pattern, photolithography process may be mentioned. Then, the substrate is subjected to a proton exchange treatment to produce proton-exchanged portions 2.

The inventors have found out also that a ferroelectric optical single crystal film of a superior crystalline property can be formed by a liquid phase epitaxial growing process on the surface portions of the substrate 1 from which the proton-exchanged portions 2 were selectively removed. Japanese Patent Application Laid-open No. 63-158,506 reported that the etching rate of a dry or wet etching can be increased by proton exchange of $LiNbO_3$. Thus, the inventors tried to produce protruded and recessed portions by means of this method. For producing the protruded and recessed portions, a tantalum film was deposited to a thickness of 400 nm on a +C surface of a Z cut $LiNbO_3$ substrate by a sputtering process, and then the tantalum film was processed by a photolithography process and a dry etching process to provide a periodic stripe-shaped structure. Then, the substrate was heat treated in a pyrophosphoric acid at 230° C. for 1 hr to provide proton-exchanged portions of a thickness of about 1 μm. The thickness of the proton-exchanged portions is determined by a proton diffusion constant of proton and varies depending on the used substrate, proton exchange temperature, and time. Thereafter, the substrate was immersed in a $HF/HNO_3$ mixed solution at about 60° C. for 1 hr to remove the proton-exchanged portions 2.

The inventors have found out that a $LiNbO_3$ crystal film having a superior crystalline property of a same degree as that of the film grown on a usual crystal surface can be grown by a liquid phase epitaxial growing process on the thus produced protruded and recessed portions. In this way, the inventors have found out that a highly selective etching process can be realized by removing the selectively proton-exchanged portions through a wet etching, and that a processed surface of a less damaged and having a superior crystalline property which is required for providing a crystal film of a high crystalline property can be provided by a liquid phase epitaxial growing process.

The reason why such advantages can be obtained is not clear. However, it is presumed that the crystalline property of the proton-exchanged portions 2 was deteriorated by exchange of metal atoms in the crystal lattice by hydrogen atoms to become an etching-easily acceptable state, so that the protruded and recessed portions of a superior crystalline property could be produced without damaging the crystalline surface.

The proton exchange process can control the thickness of the proton-exchanged portions by a precision of a few 10 nm, so that the thickness can be controlled precisely to produce an optical device of a uniform property.

The inventors examined the crystalline surface constituting the protruded and recessed portions to find out that the provision of the protruded and recessed portions on +C surface (the surface to which the polarization directs in FIG. 1*a*) is particularly effective, though the provision of the protruded and recessed portions on −C surface is also possible. Etching rates by an acid containing HF are compared in the following Table 1.

TABLE 1

| Etching surface | Etching rate |
|---|---|
| + C surface | ~0 |
| − C surface | <0.01 |
| Proton-exchanged layer (± C surface) | 1 |

As seen from the above Table 1, etching rates at the proton-exchanged portions and the +C surface are largely different. As a result, etching of a high selection ratio can be realized to remove the proton-exchanged portions substantially completely without damaging the crystalline surface.

Preferably, the width of the stripe of the window portions of the mask for performing the selective proton exchange satisfy a condition of at least $W<\Lambda/2a$, when taken the width of the window as W and the periodic cycle of providing the window is taken as Λ. When selectively performing the proton exchange through a mask, the proton-exchanged portions becomes larger than the window portions of the mask by the lateral diffusion of protons. For producing a SHG device of a high efficiency the duty (width of domain inversion/Λ) of the domain inversion has to be approached to 50%, so that the width of the window portions of the mask for proton exchange has to be $W<\Lambda/2a$.

As described above, the recessed portions 3 can be formed simultaneously, as shown in FIG. 1*b* thereby to provide a pattern of protruded and recessed portions. Then, a ferroelectric optical single crystal film 4 is formed on the main surface 1*a* of the substrate 1 by a liquid phase epitaxial growing process, as shown in FIG. 1*c*. At that time, a portion 5 of the single crystal film 4 is formed in the respective recess 3. The polarization direction N of the film 4 is opposite to the polarization direction M of the substrate 1. At this state, a periodic domain-inverted structure has been constituted. By further processing the surface of the film 4, the film portions 6 other than the film portions 5 in the recessed portions 3 can be made thin on the surface, as shown in FIG. 1*d*. Also, the film portions 6 of the film 4 can be removed except for the film portions 5 in the recessed portions 3. For such a processing method, mechanical grinding by surface grinding, or chemical mechanical polishing, etc. may be mentioned.

Referring to FIG. 2*a*, a first ferroelectric optical single crystal film 7 is formed on the main surface 1*a* of the single-domained substrate 1 by a liquid phase epitaxial growing process. The first single crystal film 7 has a polarization direction O opposite to the polarization direction M of the substrate 1. Then, by performing a poling operation, the polarization direction of the first film 7 is reversed to a direction P, as shown in FIG. 2*b*. Such a poling operation is publicly known. Then, a mask of a desired pattern is provided on the film 7, and the substrate 1 and the film 7 are subjected to a proton exchange treatment to provide proton-exchanged portions 9 in the film 8, as shown in FIG. 2*c*.

Then, the proton-exchanged portions 9 are selectively removed to form a plural recessed portions 3 simultaneously in the film 10 thereby to provide a protruded and recessed structure, as shown in FIG. 3*a*. Then, a second ferroelectric optical single crystal 11 is formed on the film 10 by a liquid phase epitaxial growing process, as shown in FIG. 3*b*. At that time, a portion 12 of the film 11 is formed in the respective recess 3. The polarization direction Q of the film 11 is opposite to the polarization direction P(M) of the film 10. At this state, a periodic domain-inverted structure 16 has been constituted. By further processing the surface of the second film 11, the film portions 13 other than the film portions 12 in the recessed portions 3 can be made thin on the surface, as shown in FIG. 1*d*. Also, the film portions 13 of the film 11 can be removed except for the film portions 12 of the film 11.

When forming the ferroelectric optical single crystal film on the ferroelectric optical single crystal substrate, the liquid phase epitaxial growing temperature of the film is made larger than the Curie temperature of the film, preferably with a temperature difference thereof in a range of 20–100° C. so as to further improve the resistance to optical damage.

As the material for the substrate usable in the present invention, use may be made of, for example, $LiNbO_3$, $LiTaO_3$, LNT, KLN, KLNT, and these compounds containing neodymium, europium or the like rare earth element, magnesium, zinc, etc. with the understanding that they satisfy the aforementioned conditions according to the present invention.

In a particularly preferable embodiment of the present invention, a lithium niobate single crystal substrate is used as the substrate, and a film of a solid solution of lithium niobate—lithium tantalate is used as the ferroelectric optical single crystal film. This is a combination which heretofore has been considered difficult from the viewpoint of the solubility. The inventors have found out that, when expressed the composition of the solid solution film of lithium niobate—lithium tantalate as $LiNb_1$-x Tax $O_3$, the solid solution film can be produced in practice in a range of x of $0 \leqq x \leqq 0.8$ In another preferable embodiment, a single crystal substrate consisting of the solid solution film of lithium niobate—lithium tantalate is used as the substrate, and a film consisting of lithium niobate—lithium tantalate is produced. The composition of the lithium niobate—lithium tantalate single crystal film can be expressed as $LiNb_1$-z Ta z $O_3$ (z is $0<z \leqq 0.8$), and x and z satisfy a relation of $z<x$, so that z is $0<z<0.8$. That is, the solid solution film has a higher proportion of substitution than the substrate.

In the above embodiment, a melt for contacting the substrate consists mainly of $Li_2O$, $Nb_2O_5$, $Ta_2O_5$ and a flux. $Li_2O$ is reciped in an amount substantially equal to the sum (mols) of the reciped amounts of $Nb_2O_5$, $Ta_2O_5$ and a flux. The melt may be considered as a pseudo three elementally composition of $LiNbO_3$—$LiTaO_3$-melt medium consisting of $LiNbO_3$ and $LiTaO_3$ which are melt solute components and a melt medium component which is a flux. Alternatively, the melt may be considered as a pseudo two elementally composition of $LiNb_1$-x Tax $O_3$-melt medium consisting of $LiNb_1$-x Ta x $O_3$ which is a melt solute component and a melt medium component which is a flux. As such a flux, $V_2O_5$, $B_2O_3$, $MoO_3$ or $WO_3$ is preferable.

Referring FIG. 4, a phase diagram of a pseudo two elementally composition of $LiNb_1$-x Ta x $O_3$—$LiVO_3$ is shown. The abscissa represents the proportion of LiNb1-xTax $O_3$—$LiVO_3$ in mol %, and the ordinate represents the temperature. FIG. 5 is a three elementary phase diagram of a pseudo three elementally composition of $LiNbO_3$—$LiTaO_3$—$LiVO_3$ obtained by modifying the phase diagram of FIG. 4. The numeral values "900" and "1,300" represent respectively a saturation temperature at the respective composition.

The composition of the liquid phase at the saturation has to be at first those portions of a saturation temperature of not more than 1,200° C. in the three elementary phase diagram. This is because Curie temperature of the lithium niobate single crystal substrate is about 1,200° C. and the contacting of the substrate to the liquid phase portion of the film exceeding 1,200° C. causes the substrate to multi-domained to deteriorate the crystalline property of the substrate thereby to causes the production of the film of a high quality becomes difficult. Such a range of composition is defined by the line I in the three elementary phase diagram of FIG. 5.

From such a viewpoint, in order to produce the film of a high quality, the liquid phase portion of the film of a spuercooled state is preferably a temperature of not more than 1,150° C. This is because, by adopting a film-forming temperature of not more than 1,150° C., the crystalline property of the film is further improved, and the damage in the optical waveguide caused by the beam light is noticeably decreased when the optical waveguide was produced in the film. The film-forming temperature is preferably not less than 750° C. If the film-forming temperature is less than 750° C., the provision of the solid solution film was difficult.

Composition range of the melt is within the range of the pseudo-ternary composition defined in the three elementary phase diagram of FIG. 5. In FIG. 5, the quoted numerals correspond to (mols of $LiVO_3$, mols of $LiNbO_3$, mols of $LiTaO_3$).

The inventors have found out that the proportion of mols of $LiNbO_3$:mols of $LiTaO_3$ has to be at least 40% but not more than 60%. Though the reason is not clear why such a proportion is necessary, it is presumed as follows. Hereinbelow, the explanation will be made with reference to the schematic characteristic graphs shown in FIGS. 6*a*–6*c*. In the respective graph shown in FIGS. 6*a*–6*c*, the ordinate abscissa represents the dissolution rate or the precipitation rate, while the abscissa represents proportion of mols of $LiTaO_3$ to mols of $LiNbO_3$.

In order to precipitate the solid solution film on the lithium niobate single crystal substrate, the precipitation rate of the solid from the liquid phase has to be faster than the dissolution rate of lithium niobate in the liquid phase of a spuercooled state. If the mols of $LiNbO_3$ is smaller, namely if the characteristic curve goes to the rightward direction more and more in the graph, the solubility of lithium niobate in the melt becomes higher, and as a result the dissolution rate of lithium niobate in the melt becomes larger. Meanwhile, if the mols of $LiNbO_3$ is smaller, the precipitation rate of $LiNbO_3$ becomes smaller. As a result, the dissolution rate of lithium niobate is equal to the precipitation rate of the solid solution film at a point F, and the dissolution rate of lithium niobate is larger than the precipitation rate of the solid solution film at the rightward range beyond a line vertically passing the point F, so that the film formation becomes impossible.

Figure 6A:
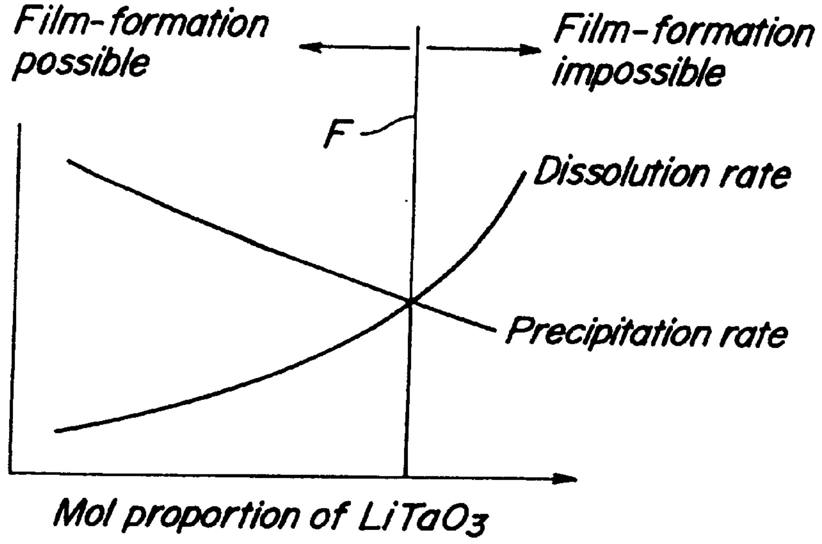
FIGS. 6*a*–6*c* are characteristic graphs showing relations between the proportion of $LiTaO_3$, the dissolution rate of lithium niobate from the substrate and the precipitation rate of a film of a solid solution on the substrate in the aforedescribed pseudo-ternary composition.
Figure 6B:
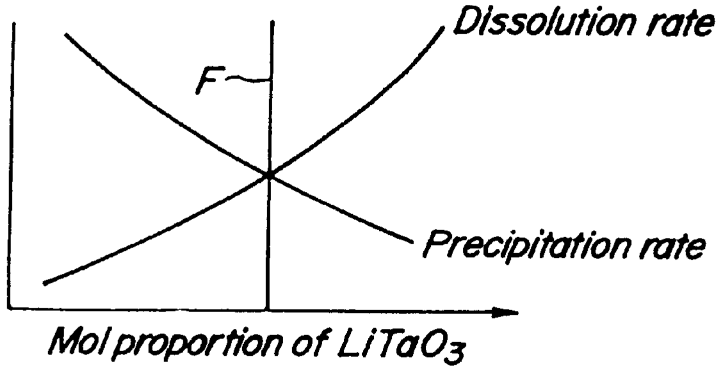
Figure 6C:
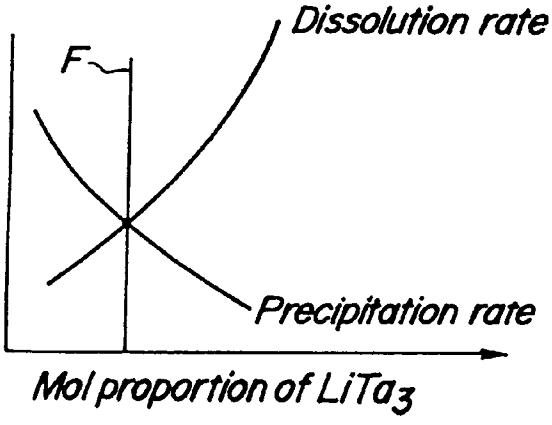

The spuercooling extent of the liquid phase is considered also important. FIG. 6*a* is a graph when the spuercooling extent is large, while FIG. 6*b* is a graph when the spuercooling extent is smaller than FIG. 6*a*, and FIG. 6*c* is a graph when the spuercooling extent is smaller than FIG. 6*b*. If the spuercooling extent of the liquid phase is smaller, then the precipitation rate of the solid solution film becomes smaller and the temperature of the liquid phase is increased, so that the dissolution rate of lithium niobate is increased. As a result, the mol proportion of film-formable $LiTaO_3$ becomes decreased.

If the graphs of FIGS. 6*a*–6*c* only are taken into consideration, enlarging of the spuercooling extent is sufficient for increasing the mol proportion of $LiTaO_3$. However, if the spuercooling extent is excessively large, the spuercooled state cannot stably be controlled. In practice, if the spuercooling extent exceeds 500° C., the spuercooled state could not be maintained.

From the reasons as described above, the content or proportion of formable $LiTaO_3$ in the liquid phase is restricted. Concretely explaining, if the mols of $LiNbO_3$ becomes less than 40%, the film was unable to form, even when the spuercooled extent was precisely controlled to approach at around 50° C. Such a composition range is defined by a linear line J connecting the point B (95, 2, 3) and the point E (0, 40, 60) in the three elementary phase diagram of FIG. 5.

There is also a formable range with respect to the solvent and the solute. Namely, if the proportion of $LiVO_3$ is not more than 60%, the film of a high quality could not be formed. Though the reason is not clear, it is presumed that the decrease of the proportion of the solvent and the increase of the proportion of the solute resulted in the increase of the concentration of the solute in the liquid phase to increase the viscosity of the liquid phase portion, so that the film cannot be grown smoothly thereby to worsen the crystalline property of the film. Such a composition range is defined by a linear line H connecting the point C (60, 40, 0) and the point D (60, 0, 40) in the three elementary phase diagram of FIG. 5.

If the content of the solute is not more than 5%, the concentration of the solute so thin that the concentration of the solute is liable to change largely in the melt accompanying the growth of the film to make the film formation impossible. Such a composition range is defined by a linear line K connecting the point A (95, 5, 0) and the point B (95, 2, 3) in the three elementary phase diagram of FIG. 5. The composition range is naturally defined by a linear line G connecting the point A (95, 5, 0) and the point c (60, 40, 0).

Although the above explanations have been made with reference to the case of lithium niobate single crystal substrate, the inventors have found out that the above described relations are also applicable to the lithium niobate-lithium tantalate solid solution single crystal.

Although the above explanations have been made with reference to the case of using $V_2O_5$ as a flux, the inventors have found out that fundamentarily the similar results can be obtained when used $B_2O_3$, $MoO_3$ or $WO_3$ is used as a flux.

Referring to the optical waveguide element shown in FIGS. 1*a*–1*d*, a film 4, 6 of a composition of LiNb1-xTax $O_3$ is formed on the aforementioned substrate 1 of a composition of $LiNb_1$-zTaz $O_3$ (0<z≦0.8) or $LiNbO_3$ by a liquid phase epitaxial growing process. The suffix x is 0.8 at the maximum and preferably at least 0.02.

Referring to the optical waveguide element shown in FIGS. 3*a*–3*c*, a first ferroelectric optical single crystal film 10 of a composition of $LiNb_1$-x Tax $O_3$ is formed on the aforementioned substrate 1 of a composition of $LiNb_1$-zTaz $O_3$ (O<z≦0.8) or $LiNbO_3$ by a liquid phase epitaxial growing process. Then, a lithium niobate—lithium tantalate solid solution film is formed on the first film 10 by a liquid phase epitaxial growing process. The second film 11, 13 has a composition of LiNb1-y Tay $O_3$ (0≦y≦0.8) wherein x and y satisfy a relation of y<x.

The above described composition formulae LiNb1-z Taz $O_3$, $LiNb_1$-x Tax $O_3$ and $LiNb_1$-yTay $O_3$ have been respectively expressed by a usual expression style usually used in the field of technology, and as usual the proportion of the atoms (Li) constituting the A site to the atoms (Nb and Ta) constituting the B site in the respective composition formula has not been described.

In applying the optical waveguide element of the present invention to practical devices, a strong incident beam light is often used. In using a strong incident beam light, a so-called optical damage phenomenon of changing the refractive index and the like characteristic property have become a large problem. For example, Appl. Phy. Lett. 30, (1977), pp 238–239 describes that a lithium tantalate single crystal has a more superior resistance to optical damage than a lithium niobate single crystal. A lithium niobate single crystal and a lithium tantalate single crystal are produced usually by a Czochralski technique. However, lithium tantalate has a melting point higher than lithium niobate, so that lithium tantalate is difficult to grow and a single crystal of an optical grade is difficult to obtain.

A lithium niobate single crystal and a lithium tantalate single crystal grown by a usual Czochralski technique have respectively a congruent composition, and the composition is e.g. Li/Nb=0.946 for a lithium niobate single crystal as reported in J. Chem. Phys. 56, (1972), pp 4848–4851. As for a lithium tantalate single crystal, Li/Ta=0.951 as reported in J. Crystal growth 10, (1971), pp 276–278, for example. For example, J. Crystal growth 116, (1992), pp 327–332 describes an example of producing a lithium niobate single crystal of a stoichiometric composition by a puling up process using double crucibles. However, the crystalline property and the resistance to optical damage of the lithium niobate single crystal produced by the process are inferior to the lithium niobate single crystal of a congruent composition produced by a usual Czochralski technique. As for lithium tantalate single crystal, there is no example of producing a lithium tantalate single crystal of a stoichiometric composition by a pullin up process and no study has been made on its characteristic property.

The inventors have found out that the resistance to optical damage of the lithium niobate—lithium tantalate solid solution film can noticeably be improved if the solid solution has a composition of LiNb1-xTax $O_3$ in the single crystal substrate product, and the ratio of lithium content (content of metals at A site) /a sum of tantalum content+niobium content (content of metals at B site) is in a range of 0.98–1.02. Also, as regard to the second film, the resistance to optical damage can similarly noticeably be improved if it has a composition of LiNb1-yTay $O_3$, and the ratio of lithium content/a sum of tantalum content+niobium content is in a range of 0.98–1.02.

The inventors have found out that the resistance to optical damage can noticeably be improved at that time, if the substitution proportion x or y by tantalum is at least 0.05. This is considered due to the function and effect of the addition of tantalum. In the sense of the meaning, x or y of at least 0.1 is more preferable. The inventors have found out that the threshold value of the resistance to optical damage is noticeably decreased, if x or y exceeds 0.7. This is considered presumably due to an increase of the difference (lattice mismatch) between the lattice constants of the film and the substrate to deteriorate the crystalline property, if the content of tantalum exceeds 0.70. From the view point, x or y of not more than 0.6 is more preferable.

The reason is not clear why the resistance to optical damage could noticeably be increased by using the ratio of lithium content (content of metals at A site)/a sum of tantalum content+niobium content (content of metals at B site) in a range of 0.98–1.02. However, it is presumed that at the composition near around the stoichiometric composition the crystal defects were decreased and more complete crystal was produced.

Hereinafter, the present invention will be explained in more detail with reference to Examples.

EXAMPLE 1

A tantalum film was deposited to a thickness of 60 nm on a +Z surface of a lithium niobate single crystal substrate of an optical grade by a sputtering process. Then, a patterning was performed by a photolithography process, and the substrate was subjected to a dry etching process in a CF4 atmosphere to produce a mask of a pattern corresponding to a periodic protruded and recessed structure of a periodic cycle of 3.4 $\mu$m. The substrate was immersed in a pyrophosphoric acid at 260° C. for 60 min. into form proton-exchanged portions of a depth of 2 $\mu$m in the non-masked portions.

Thereafter, the substrate was immersed in an etching solution of $HF:HNO_3$=2:1 at 60° C. for 1 hr to selectively remove solely the proton-exchanged portions to form a periodic protruded and recessed structure of a depth of 2 $\mu$m and a periodic cycle of 3.4 $\mu$m.

The inventors examined the influence of the forming process of the periodic protruded and recessed structure over the crystalline property of the substrate. Concretely, the processed substrate and a non-processed substrate were respectively measured on an X-ray locking curve to measure a half-width of the locking curve. As a result, the non-processed substrate had a half-width of 6.8 sec and the processed substrate had a half-width of 6.8 sec. Therefore, it was found that the crystalline property of the substrate was not deteriorated substantially by the forming process.

EXAMPLE 2

The procedure of Example 1 was repeated to produce a lithium niobate single crystal substrate having a protruded and recessed structure. Then, a lithium niobate—lithium tantalate single crystal film was formed on +Z surface of the substrate by a liquid phase epitaxial growing process.

A melt of a pseudo-ternary composition of $LiNbO_3$—$LiTaO_3$—$LiVO_3$ was prepared. The melt was agitated at a sufficiently high temperature (1,100–1,300° C.) for at least 3 hrs to yield a liquid phase of a sufficiently uniform state. Thereafter, the melt was cooled to 1,010° C. and held thereat for at least 12 hrs. As a result, nuclei of an excessively saturated portion of the solid solution were formed in the melt, and a solid phase was precipitated on the wall surface of the crucible. At that time, the liquid phase portion of the melt was in a state saturated at 1,010° C. and the melt was in a state of coexisting of the liquid phase portion and the solid phase portion.

Thereafter, the melt was cooled from a temperature of 1,010° C. to a film forming temperature of 980° C. Then, the lithium niobate single crystal substrate was contacted immediately to the liquid phase portion of the melt to perform the film forming. The thus obtained solid solution film had a composition of Ta/(Nb+Ta)=0.4. The lithium niobate single crystal substrate has Curie temperature of 1,175° C. and the thus obtained solid solution film has Curie temperature of 950° C.

Subsequently, an optical waveguide vertical to a periodic pattern was formed on the thus obtained solid solution film by a proton exchange process. Concretely, a tantalum film was deposited to a thickness of 400 nm by a sputtering process on the solid solution film, and then a photolithography process was performed of forming windows of a line width of about 4 nm vertical to the periodic pattern. Then, the substrate was immersed in a pyrophosphoric acid at 230° C. for 10 min to remove the Ta film, and then subjected to an annealing treatment at 300° C. for 15 min to provide an optical waveguide.

In this way, an optical waveguide element having the periodic domain-inverted structure was produced. When it was irradiated by a laser beam light of a wavelength of 860 nm and an output of 100 mW, it emitted an output beam light of a wavelength of 430 nm and an output of 4 mW.

Another Example

In this example, a structure of a SHG device which utilizes that a ferroelectric optical single crystal film of a reversed polarization direction can be formed on the ferroelectric optical single crystal substrate, will be explained. For improving the efficiency of a SHG device, increasement of a power density of the fundamental wave is effective and a system of using a three dimensional optical waveguide has been adopted. Thus, regarding the system of capable of forming an optical waveguide, the following three device structures will be explained. Segment type optical waveguide structure Segment type optical waveguide structure+embedded type optical waveguide structure (to be refereed to as "Segment type+embedded type optical waveguide structure, hereinafter)

Segment type optical waveguide structure using protruded portions of a large refractive index

EXAMPLE 3

(Segment type optical waveguide structure)

Rectangular recessed portions 18 were formed in a single-domained ferroelectric optical single crystal substrate 21, and a ferroelectric optical single crystal film 17 was formed on the single crystal substrate 21, as shown in FIG. 7. The polarization direction of the single crystal film 17 was reverse to the polarization direction of the substrate 21, and the refractive index of the single crystal film 17 was larger than the refractive index of the single crystal substrate 21. A fundamental wave 19 is transmitted between the films 22 in the recesses 18 of a large refractive index and the recesses 18 and quasi phase-matched with a SHG in the domain-inverted recesses 18 to emit a SHG output 20.

The above device can be produced in the same manner as in Example 1. In such a case, by changing the pattern of the mask for forming the proton-exchanged portions, a periodic domain-inverted structure can be formed. The size of the rectangular recessed portions 18 can have a width×a length×a depth of 5×1.7×2 μm, for example, and the transmission loss of a fundamental wave of a wavelength of 860 nm was 3–4 dB/cm in this case. When a fundamental wave of an input of 100 mW was transmitted, an SHG of an output of about 100 mW was obtained. Because the fundamental wave was enclosed in a three dimensional state, the power density was increased and the conversion of the wavelength at high efficiency became possible.

In addition, the resistance to optical damage of the device was measured. As a result, at a SHG output of a wavelength of a 400 nm band of an output of a several mW, the device did not show fluctuation of the output to exhibit a superior resistance to optical damage. The reason therefor is considered due to that the optical waveguide could be produced without performing the etching or diffusion process for producing the three dimensional optical waveguide according to this structure, so that the damage to the ferroelectric optical single crystal film was small and the optical waveguide of a superior crystalline property could be produced.

EXAMPLE 4

(Segment type+embedded type optical waveguide structure)

As shown in FIG. 8, a stripe-shaped groove 15 was formed in the single-domained ferroelectric optical single crystal substrate 21, and the rectangular recessed portions 18 were formed in the groove 15, and a ferroelectric optical single crystal film 17 was formed on the single crystal substrate 21. The polarization direction of the single crystal film 17 was reverse to the polarization direction of the substrate 21, and the film 17 had a refractive index higher than the substrate 21. In the aforedescribed segment type optical waveguide structure, the beam light is transmitted through the rectangular portions (recessed portions) 18 of a high refractive index, however, there is a problem in that the loss of the transmitted beam light due to scattering becomes large at the boundaries of segments to decrease the conversion efficiency of SHG. Thus, the inventors made various studies on the optical waveguide structure to find out that the transmission loss of the beam light in the optical waveguide can widely be reduced by forming the embedded type optical waveguide structure on the segment type optical waveguide structure.

The segment type+embedded type optical waveguide structure was produced in the same manner as in Example 3, and the transmission loss of a fundamental wave of a wavelength of 860 nm was measured to find a value of 1–2 dB/cm which is a half value of that of the segment type optical waveguide structure. Therefore, it was found that the conversion efficiency of SHG was also improved to 1.5 times of that of the segment type optical waveguide structure.

EXAMPLE 5

(Segment type optical waveguide structure using protruded portions of a high refractive index)

In this example, another method of producing the segment type optical waveguide structure will be explained. In the above described segment type optical waveguide structure, the ferroelectric optical single crystal film 17 having a refractive index higher than the refractive index of the substrate 21 was used. However, the same segment type optical waveguide structure as described above could be produced by forming single crystal protruded portions 23 of a high refractive index on the surface of the substrate 21 and forming a ferroelectric optical single crystal film 24 on the protruded portions 23, as shown in FIG. 9.

According to this structure, the refractive index of the deposited ferroelectric optical single crystal film 24 is not restricted, so that this structure has an advantage in that the width of selecting the crystalline material for constituting the single crystal film 24 can be broadened.

A process of producing the waveguide structure will be explained briefly. For example, a ferroelectric optical single crystal film 26 was formed on the single-domained substrate 21, as shown in FIG. 10*a*. The polarization direction of the substrate 21 and the polarization direction of the film 26 are reversed. A mask 27 of a desired pattern was provided on the film 26. Then, the substrate 21 was subjected to a proton exchange treatment to form proton-exchanged portions 28, as shown in FIG. 10*b*.

Then, the proton-exchanged portions 28 are selectively removed by etching to provide recessed portions 30 between the protruded portions 23. Then, a ferroelectric optical single crystal film 24 was formed by a liquid phase epitaxial growing process to fill a portion 24*a* of the film 24 between the protruded portions 23, thereby to provide a periodic domain-inverted structure.

FIGS. 11–14 are graphs for illustrating the process of producing an optical element having the periodic domain-inverted structure according to the invention of claims 9–11. In a laminated body 45 shown in FIG. 11, the ferroelectric optical single crystal substrate 1 was single-domained. The polarization direction of the substrate 1 is shown by the arrow M. A surface of the substrate 1 is provided with periodically formed plural recessed portions 3. The substrate 1 had a ferroelectric optical single crystal film 4 formed thereon preferably by a liquid phase epitaxial growing process. At that time, a portion 5 of the single crystal film 4 was formed in the respective recess 3. The polarization direction of the film 4 is a direction N opposite to the polarization direction M of the substrate 1, thus forming a periodic domain-inverted structure 15. Such a laminated body can be obtained by the process which was explained with reference to FIGS. 1*a*–1*d*. The reference numerals 31, 32 are side surface of the substrate 1 and the reference numeral 33 is a surface of the film 4.

Then, a mask of a shape corresponding to the planar shape of a ridge structure was formed on the surface of the film 4, as shown in FIGS. 12*a* and 12*b*. In this embodiment, the mask 34 extended linearly between a pair of opposing side surfaces 32 of the substrate 1. The production process and the material of the mask 34 were already described above. The surface of the film 4 was divided into portions 35A and 35B by the mask 34. Preferably, the mask 34 was extended in a vertical direction to the extending direction of the film 5 in the recessed portions 3 and the respective recessed portion 3.

Figure 13:
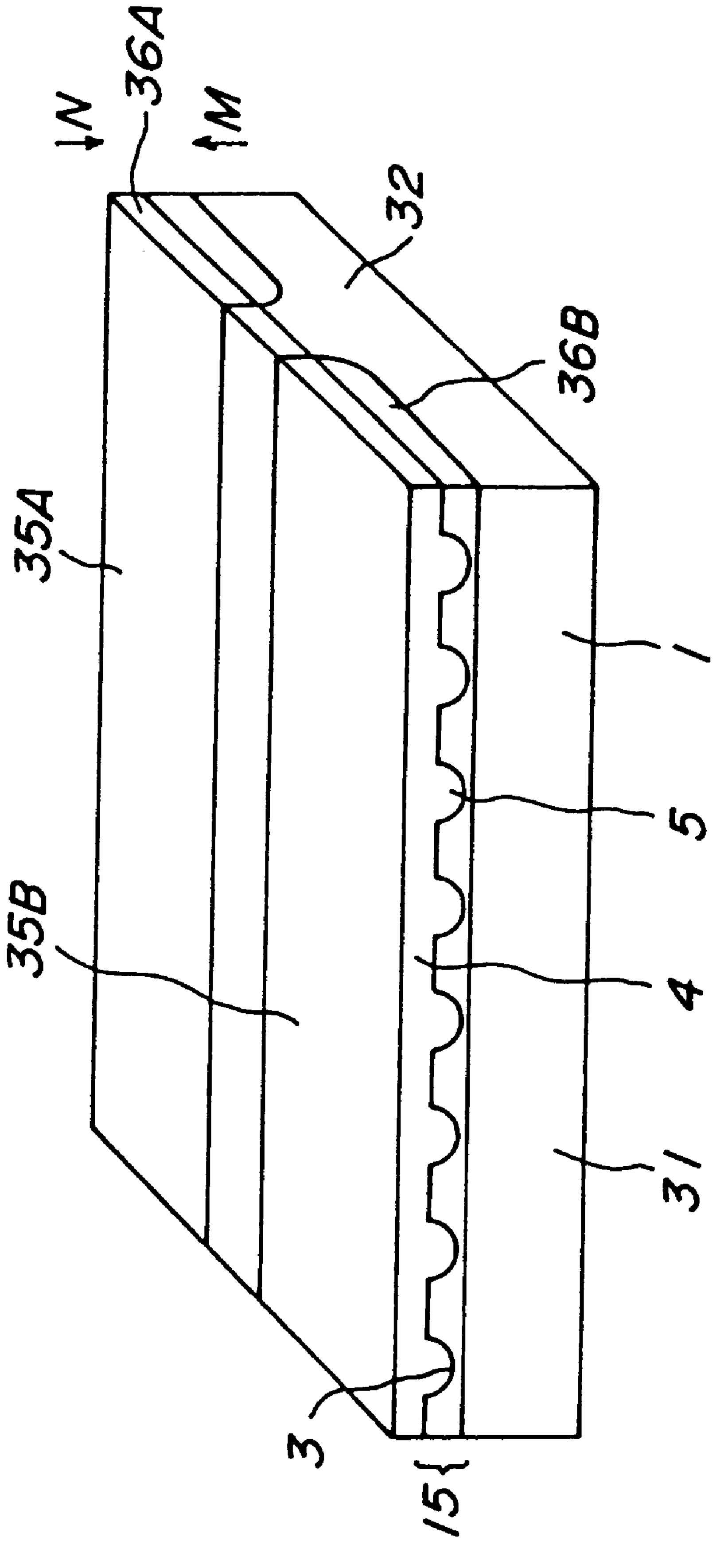
FIG. 13 is a schematic perspective view of the laminated body 45 FIGS. 12*a* and 12*b* after the proton exchange treatment.

Then, the laminated body was subjected to a proton exchange treatment to form proton-exchanged portions 36A, 36B, as shown in FIG. 13. The process of the proton exchange was also described above.

Then, the proton-exchanged portions were subjected to an etching treatment to remove the proton-exchanged portions 36A, 36B thereby to obtain an optical element 38 shown in FIGS. 14*a* and 14*b*, wherein FIG. 14*a* is a schematic perspective view of the optical element 38 and FIG. 14*b* is a schematic front view of the optical element 38.

By removing the proton-exchanged portions 36A, 36B, recessed portions 40A, 40B were formed in place of the respective proton-exchanged portions 36A, 36B, and a ridge structure 39 extending linearly between the recessed portions 40A, 40B was formed. The ridge structure 39 had the ferroelectric optical single crystal film 4 and the periodic domain-inverted structure 15 formed therein.

According to a process which will be explained with reference to FIGS. 15 and 16, an optical element 41 having the periodic domain-inverted structure formed in the ridge structure can be produced. That is, according to the process described in FIGS. 2 and 3, the laminated body as shown in FIG. 15 can be obtained.

Figure 15:
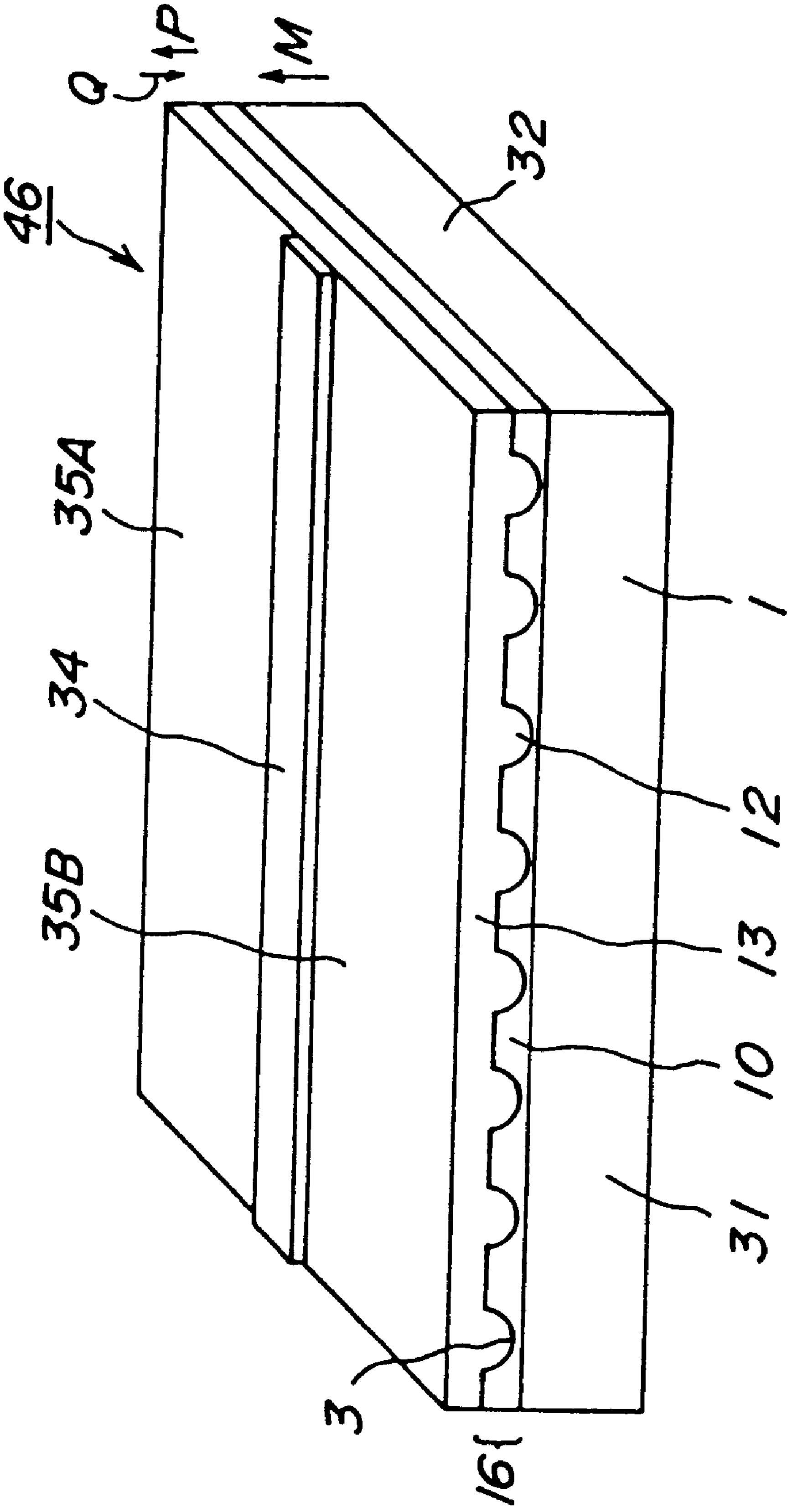
FIG. 15 is a schematic perspective view of a laminated body 46 having a periodic domain-inverted structure 16.

In the laminated body shown in FIG. 15, the ferroelectric optical single crystal substrate 1 was single-domained in the direction shown by the arrow M. On the single crystal substrate 1 was provided a ferroelectric optical single crystal preliminary layer 10, and plural recessed portions 3 were periodically formed on the preliminary layer 10. On the preliminary layer 10 was formed a ferroelectric optical single crystal film 13 preferably by a liquid phase epitaxial growing process. At that time, a film portion 12 of the film 13 was formed in the respective recessed portion 3. The polarization direction of the preliminary layer 10 is the same direction (as shown by the arrow P) with the polarization direction of the substrate 1 and the polarization direction Q of the film 13 is opposite to the polarization direction P of the preliminary layer 10, thereby to form a periodic domain-inverted structure 16.

Then, the mask 34 of a shape corresponding to the planar shape of the ridge structure was formed on the surface of the film 13 in the same manner as described in FIGS. 12*a* and 12*b*. Preferably, the mask 34 was extended in a vertical direction to the extending direction of the film 12 in the recessed portions 3 and the respective recessed portion 3. Then, the laminated body was subjected to a proton exchange treatment to form proton-exchanged portions 36A, 36B similarly as in FIG. 13.

Then, the proton-exchanged portions were subjected to an etching treatment to remove the proton-exchanged portions 36A, 36B thereby to obtain an optical element 41 shown in FIGS. 16*a* and 16*b*.

By removing the proton-exchanged portions 36A, 36B, the recessed portions 40A, 40B were formed in place of the respective proton-exchanged portions 36A, 36B, and a ridge structure 42 extending linearly between the recessed portions 40A, 40B was formed. The ridge structure 42 had the ferroelectric optical single crystal film 13, the preliminary layer 10 and the periodic domain-inverted structure 16 formed therein.

In the invention according to the process of claim 9, the process of providing the periodic domain-inverted structure in the laminated body is not limited to specific ones and the respective process explained with reference to FIGS. 7–10 may be used to provide the periodic domain-inverted structure in the ridge structure.

Hereinafter, the present invention will be explained with reference to concrete experimental results.

A tantalum film was deposited to a thickness of 60 nm on +Z surface 1*a* of a MgO-doped lithium niobate single crystal substrate 1 by a sputtering process. Then, a patterning was performed by a photolithography process. Then, the substrate was subjected to a dry etching process using a $CF_4$ gas to form a mask of a pattern corresponding to a periodic protruded and recessed structure of a periodic cycle of 3.4 μm . The substrate was immersed in a pyrophosphoric acid at 260° C. for 60 min to perform proton exchange thereby to form proton-exchanged portions 2 of a depth of 2 μm in the non-masked portion.

Then, the substrate was immersed in an etching solution of $HF:HNO_3$=2:1 at 60° C. for 1 hr to selectively remove the proton-exchanged portions 2 by etching thereby to form a protruded and recessed structure having recessed portions 3 of a depth of 2 μm and a periodic cycle of 3.4 μm.

Figure 11:
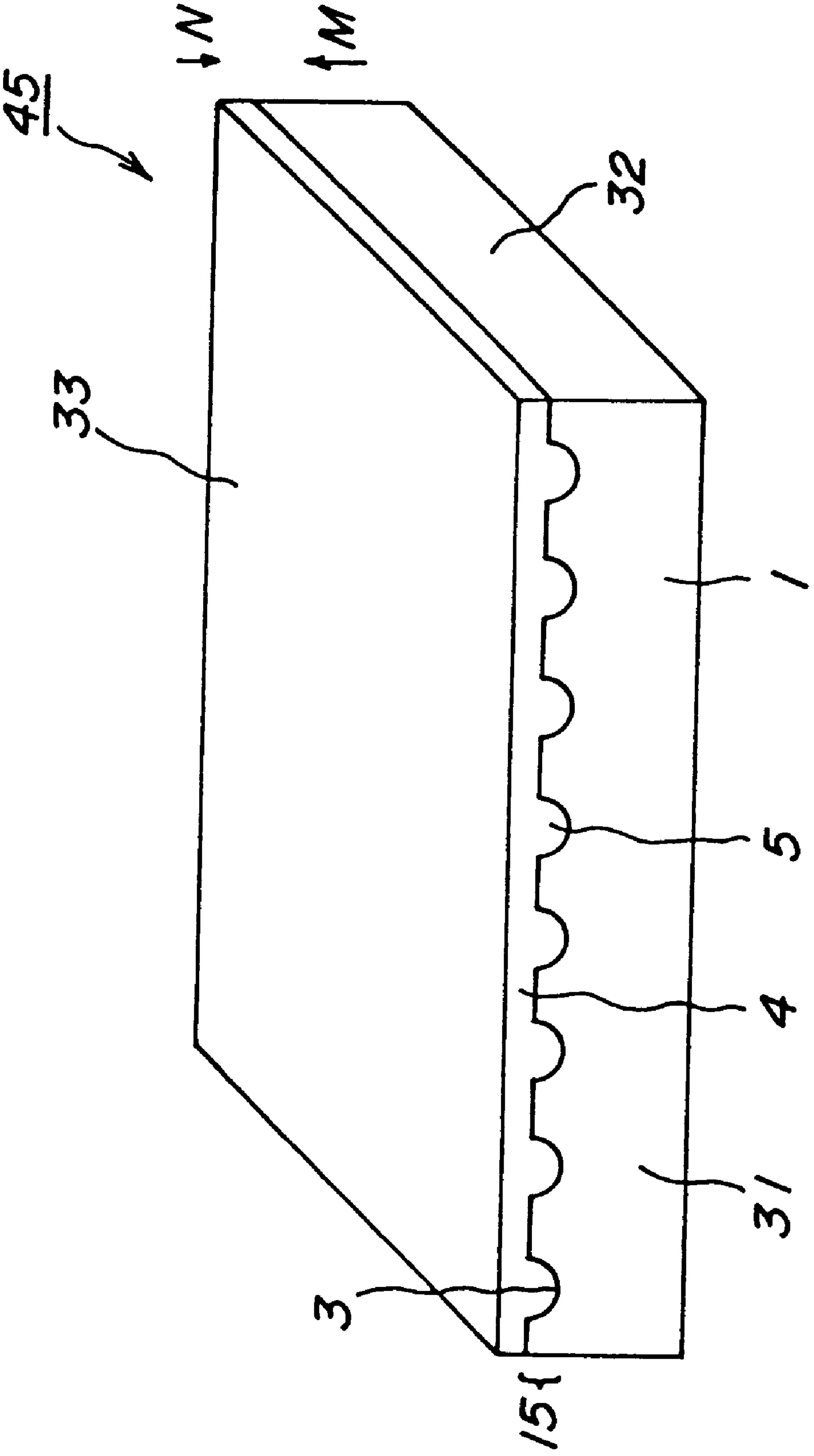
FIG. 11 is a schematic perspective view of a laminated body 45 having a periodic domain-inverted structure 15.

Thereafter, the lithium niobate single crystal film 4 was formed to a thickness of about 1 μm from the upper surface of the protruded portions on the substrate 1 having the protruded and recessed structure by a liquid phase epitaxial growing process. The respective recessed portion was completely filled by the film portion 5 of the single crystal film 4. The step difference between the formed protruded portions and the recessed portions was smoothened by the lithium niobate film 4 to give a flat surface of the film 4. The lithium niobate film 4 had a polarization direction opposite to the substrate 1. In this way, the laminated body 45 as shown in FIG. 11 was obtained.

Then, a tantalum film was deposited to a thickness of 60 nm on the lithium niobate film 4 by a sputtering process. Then, a patterning was performed by a photolithography process. Then, the laminated body 45 was subjected to a dry etching process using a $CF_4$ gas to form a tantalum mask 34 of a width of 6 μm extending in a vertical direction to the protruded and recessed pattern of the surface of the substrate 1.

Then, the laminated body 45 was immersed in a pyrophosphoric acid at 260° C. for 60 min to perform proton exchange thereby to form proton-exchanged portions 36A, 36B of a depth of 2 μm in the non-masked portion.

Then, the laminated body 45 was immersed in an etching solution of $HF:HNO_3$=2:1 at 60° C. for 1 hr to selectively remove exclusively the proton-exchanged portions 36A, 36B excluding the non proton-exchanged portions under the mask 34 by etching thereby to form a protruded stripe structure or ridge structure 39 having a height of about 2 μm and a width of about 3 μm In this way, a SHG device of a three dimensional optical waveguide type having a ridge type periodic domain-inverted structure was produced.

When the thus produced SHG device was irradiated by a fundamental wave of a wavelength of 860 nm and an input of 100 mW, it emitted a SHG output of about 1.5 mW. The SHG device was also measured on resistance to optical damage. As a result, no fluctuation of output was found at a SHG output generation of an output of about several mW and a wavelength of 400 nm band, so that it had a superior resistance to optical damage.

The reason therefor is considered that a dry etching process which affects damages on the RIE crystals and the like crystals was not performed at the time of providing the ridge type three dimensional optical waveguide structure, so that the three dimensional optical waveguide structure having a superior crystalline property could be provided.

As explained in detail in the foregoings, according to the present invention, the resistance to optical damage of the periodic domain-inverted structure can noticeably be improved when providing the periodic domain-inverted structure on the ferroelectric optical single crystal substrate. Also, the damages to the material of the substrate and the like can be reduced at that time, and the crystalline property of the substrate after the processing can be improved thereby to improve the resistance to optical damage and output of the periodic domain-inverted structure and the like optical waveguide structures.

Although the present invention has been explained with specific examples and numeral values, it is of course apparent to those skilled in the art that various changes and modifications thereof are possible without departing from the broad spirit and aspect of the present invention as defined in the appended claims.

What is claimed is:

1. An optical waveguide element having a single-domained ferroelectric optical single crystal substrate and a ferroelectric optical single crystal film formed on the single crystal substrate by a liquid phase epitaxial growing process, comprising protruded and recessed portions formed on the single crystal substrate, the single crystal film being formed on at least the respective recess of the protruded and recessed portions, the single crystal film being polarized in an opposite direction to that of the substrate, the single crystal film having Curie temperature lower than the liquid phase epitaxial growing temperature of the single crystal film, the substrate having Curie temperature higher than the liquid phase epitaxial growing temperature of the single crystal film.

2. A method for producing an optical waveguide element having a single-domained ferroelectric optical single crystal substrate and a ferroelectric optical single crystal film formed on the single crystal substrate by a liquid phase epitaxial growing process, comprising growing the single crystal film by a liquid phase epitaxial growing process on at least a respective recess of protruded and recessed portions of the substrate by a liquid phase epitaxial growing process, the single crystal film having Curie temperature lower than the liquid phase epitaxial growing temperature of the single crystal film, the substrate having Curie temperature higher than the liquid phase epitaxial growing temperature of the single crystal film, and polarizing the single crystal film in an opposite direction to that of the substrate.

3. An optical waveguide element having a single-domained ferroelectric optical single crystal substrate, a first ferroelectric optical single crystal film formed on the single crystal substrate and a second ferroelectric optical single crystal film formed on the first single crystal film, comprising protruded and recessed portions formed on the first single crystal film, the second single crystal film being formed on at least a respective recess of the protruded and recessed portions, the first single crystal film being polarized in the same direction to that of the substrate, the second single crystal film being polarized in an opposite direction to that of the substrate, the first single crystal film having Curie temperature lower than the liquid phase epitaxial growing temperature of the first single crystal film, and the substrate having Curie temperature higher than the liquid phase epitaxial growing temperature of the first single crystal film and the liquid phase epitaxial growing temperature of the second single crystal film.

4. A method for producing an optical waveguide element having a single-domained ferroelectric optical single crystal substrate, a first ferroelectric optical single crystal film formed on the single crystal substrate and a second ferroelectric optical single crystal film formed on the first single crystal film by a liquid phase epitaxial growing process, comprising growing the first single crystal film on the main surface of the single crystal substrate by a liquid phase epitaxial growing process, the first single crystal film having Curie temperature lower than the liquid phase epitaxial growing temperature of the first single crystal film, the substrate having Curie temperature higher than the liquid phase epitaxial growing temperature of the first single crystal film, polarizing the first single crystal film in the same direction to that of the substrate, forming protruded and recessed portions on the first single crystal film, growing the second single crystal film on at least the respective recess of the protruded and recessed portions by a liquid phase epitaxial growing process, the second single crystal film having Curie temperature lower than the liquid phase epitaxial growing temperature of the second single crystal film, the substrate having Curie temperature higher than the liquid phase epitaxial growing temperature of the second single crystal film, and polarizing the second single crystal film in an opposite direction to that of the substrate.

5. A method for producing a domain-inverted structure having a periodically ferroelectric domain-inverted optical single crystal structure on a single-domained ferroelectric optical single crystal substrate, comprising providing a mask of a periodic pattern on the substrate, providing proton-exchanged portions in the non-masked portions of the substrate by a proton exchange process, selectively removing the proton-exchanged portions to provide a desired pattern of protruded and recessed portions in the substrate, providing a ferroelectric optical single crystal film on at least the respective recess of the substrate by a liquid phase epitaxial growing process, and reversing the polarization direction of the single crystal film to that of the substrate.

6. An optical element having a single-domained ferroelectric optical single crystal substrate and a ferroelectric optical single crystal film formed on the substrate by a liquid phase epitaxial growing process, comprising recessed portions periodically formed in the substrate, the single crystal film being provided on at least the respective recess, the single crystal film being polarized in an opposite direction to that of the substrate, and the single crystal film having a refractive index larger than that of the substrate.

7. An optical element having a single-domained ferroelectric optical single crystal substrate and a ferroelectric optical single crystal film formed on the substrate by a liquid phase epitaxial growing process, comprising a stripe-shaped groove formed in the substrate, periodic protruded and recessed portions formed in the stripe-shaped groove, the single crystal film being formed on at least the stripe-shaped groove including the periodic protruded and recessed portions, the single crystal film being polarized in an opposite direction to that of the substrate, and the single crystal film having a refractive index larger than that of the substrate.

8. An optical element having a single-domained ferroelectric optical single crystal substrate and a ferroelectric optical single crystal film formed on the substrate by a liquid phase epitaxial growing process, comprising periodic protruded and recessed portions formed on the substrate, the single crystal film being formed on at least the respective recess, the single crystal film being polarized in an opposite direction to that of the substrate, and the respective protruded portion having a refractive index larger than that of the substrate.

9. A method for producing an optical element having a single-domained ferroelectric optical single crystal substrate, at least one layer of ferroelectric optical single crystal film formed on the substrate, a ridge structure protruded from the substrate, and a periodic domain-inverted structure formed in the ridge structure, comprising providing a mask of a shape corresponding to the ridge structure on a laminated body having at least the substrate and the single crystal film and the periodic domain-inverted structure formed therein, forming proton-exchanged portions on the non-masked portions of the laminated body by a proton exchange process, and selectively removing the proton-exchanged portions to provide the ridge structure.

10. A method for producing the optical element of claim 9, comprising providing a mask of a pattern corresponding to the periodic domain-inverted structure on the substrate, forming proton-exchanged portions in the non-masked portions of the substrate by a proton exchange process, selectively removing the proton-exchanged portions to provide a desired pattern of protruded and recessed portions in the substrate, providing the single crystal film on at least the respective recess of the protruded and recessed portions by a liquid phase epitaxial growing process, and reversing the polarization direction of the single crystal film in an opposite direction to that of the substrate to provide the periodic domain-inverted structure.

11. A method for producing the optical element of claim 9, comprising providing a ferroelectric optical single crystal preliminary layer on the substrate, providing a mask of a pattern corresponding to the periodic domain-inverted structure on the preliminary layer, forming proton-exchanged portions in the non-masked portions of the preliminary layer by a proton exchange process, selectively removing the proton-exchanged portions to provide a desired pattern of protruded and recessed portions in the preliminary layer, providing the single crystal film on at least the respective recessed portion of the protruded and recessed portions by a liquid phase epitaxial growing process, and reversing the polarization direction of the single crystal film in an opposite direction to that of the preliminary layer to provide the periodic domain-inverted structure.

* * * * *